US010041821B2

(12) United States Patent
Yamada

(10) Patent No.: US 10,041,821 B2
(45) Date of Patent: Aug. 7, 2018

(54) INDICATING-NEEDLE TYPE METER DEVICE

(71) Applicant: YAZAKI CORPORATION, Tokyo (JP)

(72) Inventor: Yoshihisa Yamada, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 386 days.

(21) Appl. No.: 15/058,782

(22) Filed: Mar. 2, 2016

(65) Prior Publication Data

US 2016/0178413 A1 Jun. 23, 2016

Related U.S. Application Data

(63) Continuation of application No. PCT/JP2014/074115, filed on Sep. 11, 2014.

(30) Foreign Application Priority Data

Sep. 13, 2013 (JP) ................................. 2013-190826

(51) Int. Cl.
  *G01D 13/22* (2006.01)
  *H02P 8/04* (2006.01)
  (Continued)

(52) U.S. Cl.
  CPC ............. *G01D 13/22* (2013.01); *H02P 8/04* (2013.01); *G01D 7/00* (2013.01); *G01D 11/16* (2013.01);
  (Continued)

(58) Field of Classification Search
  CPC ........ G01D 13/00; G01D 13/22; G01D 11/28; G01D 7/00; G01D 11/16; H02P 8/04;
  (Continued)

(56) References Cited

U.S. PATENT DOCUMENTS 5,267,526 A * 12/1993 Totsuka .................... G01R 7/06
  116/291
7,034,495 B2 * 4/2006 Sasaki ...................... G01D 7/00
  318/685

(Continued)

FOREIGN PATENT DOCUMENTS

JP  2003-130694 A  5/2003
JP  2006-064437 A  3/2006
  (Continued)

OTHER PUBLICATIONS

International Search Report for PCT/JP2014/074115 dated Nov. 11, 2014 [PCT/ISA/210].
  (Continued)

*Primary Examiner* — R. A. Smith
*Assistant Examiner* — Tania Courson
(74) *Attorney, Agent, or Firm* — Sughrue Mion, PLLC

(57) ABSTRACT

In an indicating-needle type meter device, when starting excitation of a stepping motor, a controller sets the phase of an excitation signal to a predetermined excitation start position and returns the phase of the excitation signal by a predetermined reversal angle such that an indicating-needle rotates in the backward direction, thereby positioning the indicating-needle at a stopper position. Subsequently, the controller advances the phase of the excitation signal by an origin return angle to rotate the indicating-needle in the forward direction to an origin position apart from the stopper position by a predetermined angle, thereby positioning the indicating-needle at the origin position. Here, the origin return angle is an angle obtained by adding a backlash angle, a predetermined positive pre-offset angle, and a positive placing error correction angle set based on a placing error of the indicating-needle with respect to the stopper.

11 Claims, 19 Drawing Sheets

(51) Int. Cl.
*G01D 13/00* (2006.01)
*G12B 11/00* (2006.01)
*G12B 11/02* (2006.01)
*G12B 11/04* (2006.01)
*G01D 11/28* (2006.01)
*G01D 7/00* (2006.01)
*G01D 11/16* (2006.01)
*H02P 8/00* (2006.01)

(52) U.S. Cl.
CPC .............. *G01D 11/28* (2013.01); *G01D 13/00* (2013.01); *G12B 11/00* (2013.01); *G12B 11/02* (2013.01); *G12B 11/04* (2013.01); *H02P 8/00* (2013.01)

(58) Field of Classification Search
CPC ........... H02P 8/00; G12B 11/00; G12B 11/02; G12B 11/04
USPC ... 116/62.1, 284–288, 297, DIG. 6, DIG. 36, 116/291; 318/599, 685, 696
See application file for complete search history.

(56) References Cited

U.S. PATENT DOCUMENTS

| | | | |
|---|---|---|---|
| 8,102,139 B2* | 1/2012 | Nakane | G01D 13/00 |
| | | | 318/463 |
| 2006/0144172 A1 | 7/2006 | Sasaki | |
| 2007/0251442 A1* | 11/2007 | Kodama | G05G 1/08 |
| | | | 116/294 |
| 2009/0277373 A1 | 11/2009 | Sasaki et al. | |
| 2010/0192835 A1 | 8/2010 | Nakane | |
| 2011/0100290 A1* | 5/2011 | Nakane | B60K 37/02 |
| | | | 116/286 |

FOREIGN PATENT DOCUMENTS

| | | |
|---|---|---|
| JP | 2007-232436 A | 9/2007 |
| JP | 2008-008728 A | 1/2008 |
| JP | 2010-181287 A | 8/2010 |

OTHER PUBLICATIONS

Written Opinion for PCT/JP2014/074115 dated Nov. 11, 2014 [PCT/ISA/237].

* cited by examiner

FIG.6A

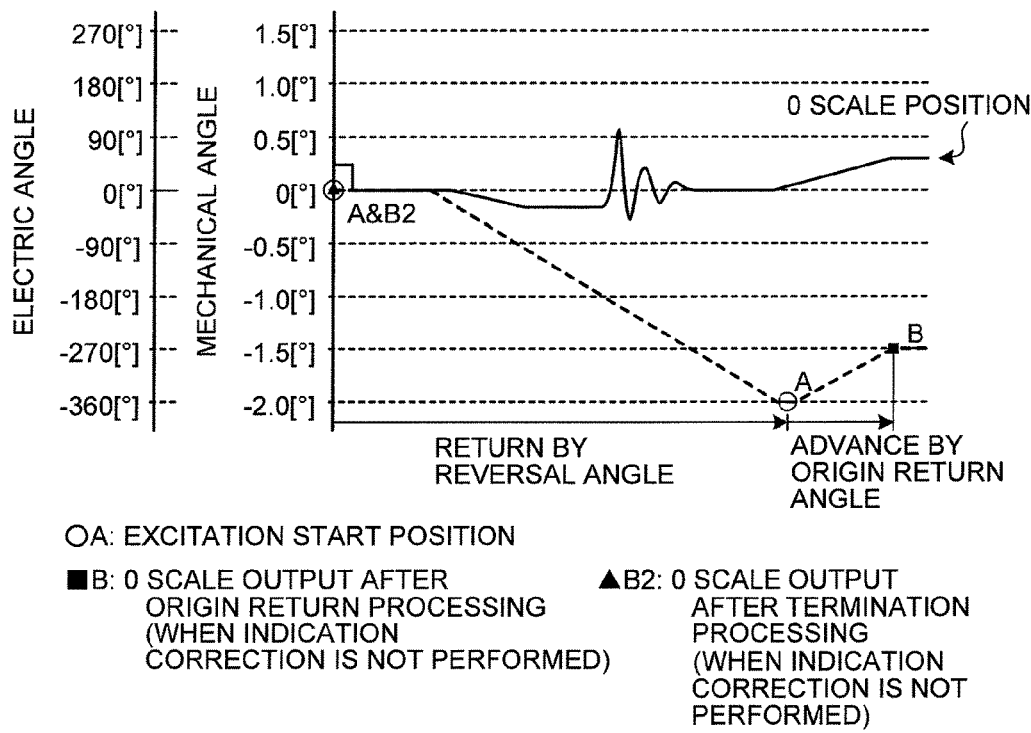

OA: EXCITATION START POSITION

■B: 0 SCALE OUTPUT AFTER ORIGIN RETURN PROCESSING (WHEN INDICATION CORRECTION IS NOT PERFORMED)

▲B2: 0 SCALE OUTPUT AFTER TERMINATION PROCESSING (WHEN INDICATION CORRECTION IS NOT PERFORMED)

FIG.6B

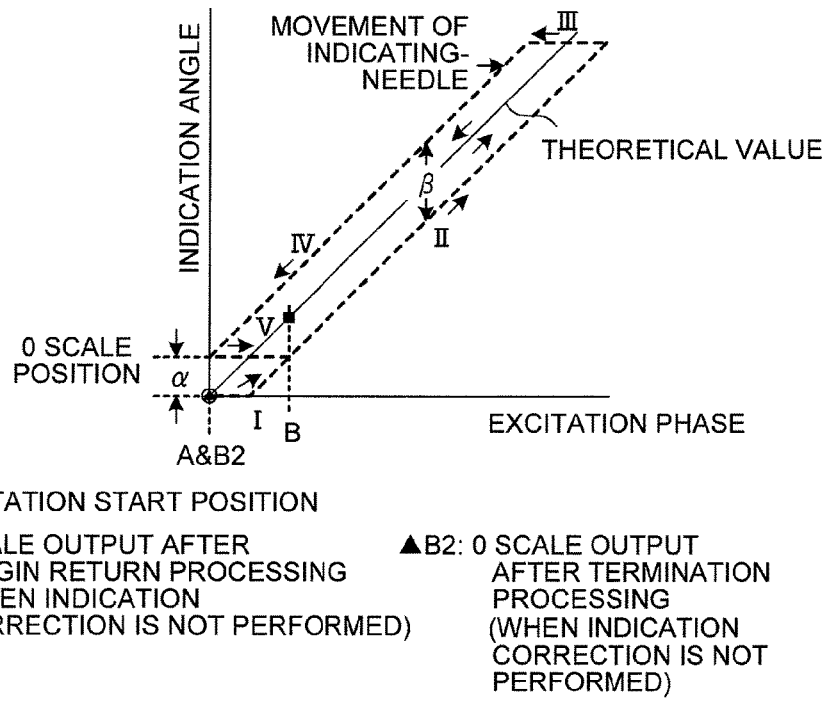

OA: EXCITATION START POSITION

■B: 0 SCALE OUTPUT AFTER ORIGIN RETURN PROCESSING (WHEN INDICATION CORRECTION IS NOT PERFORMED)

▲B2: 0 SCALE OUTPUT AFTER TERMINATION PROCESSING (WHEN INDICATION CORRECTION IS NOT PERFORMED)

FIG.6C

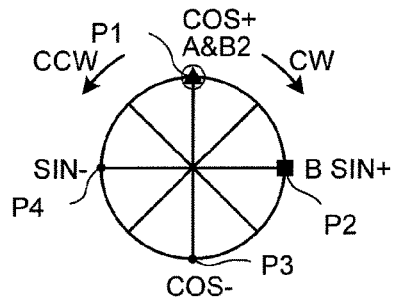

OA: EXCITATION START POSITION

■B: 0 SCALE OUTPUT AFTER ORIGIN RETURN PROCESSING (WHEN INDICATION CORRECTION IS NOT PERFORMED)

▲B2: 0 SCALE OUTPUT AFTER TERMINATION PROCESSING (WHEN INDICATION CORRECTION IS NOT PERFORMED)

FIG.7A

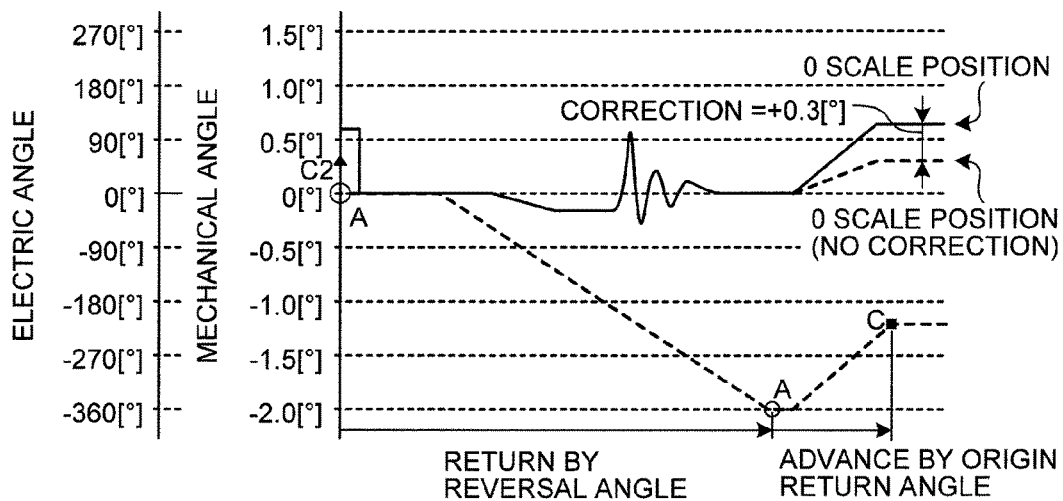

OA: EXCITATION START POSITION

B: 0 SCALE OUTPUT AFTER ORIGIN RETURN BEFORE CORRECTION

■C: 0 SCALE OUTPUT AFTER ORIGIN RETURN PROCESSING (WHEN INDICATION CORRECTION IS PERFORMED)

▲C2: 0 SCALE OUTPUT AFTER TERMINATION PROCESSING (WHEN INDICATION CORRECTION IS PERFORMED)

FIG.7B

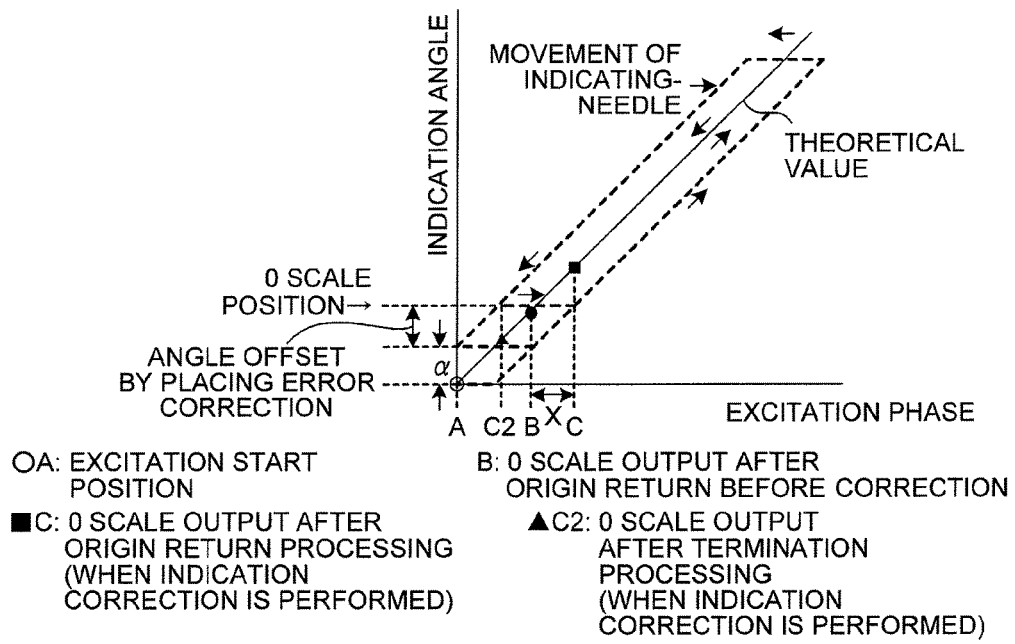

- OA: EXCITATION START POSITION
- ■C: 0 SCALE OUTPUT AFTER ORIGIN RETURN PROCESSING (WHEN INDICATION CORRECTION IS PERFORMED)
- B: 0 SCALE OUTPUT AFTER ORIGIN RETURN BEFORE CORRECTION
- ▲C2: 0 SCALE OUTPUT AFTER TERMINATION PROCESSING (WHEN INDICATION CORRECTION IS PERFORMED)

FIG.7C

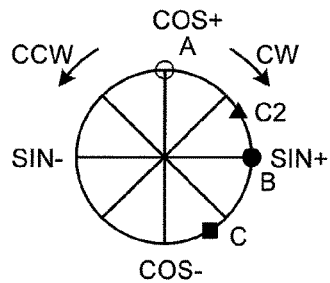

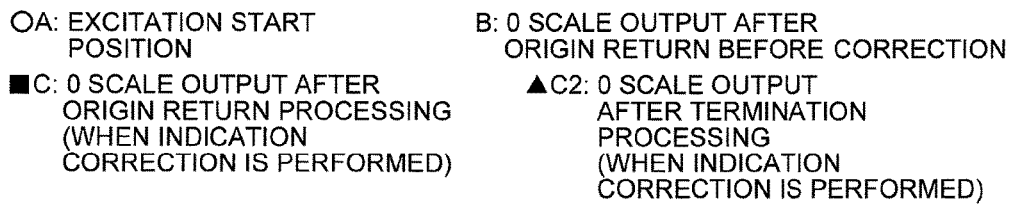

- OA: EXCITATION START POSITION
- ■C: 0 SCALE OUTPUT AFTER ORIGIN RETURN PROCESSING (WHEN INDICATION CORRECTION IS PERFORMED)
- B: 0 SCALE OUTPUT AFTER ORIGIN RETURN BEFORE CORRECTION
- ▲C2: 0 SCALE OUTPUT AFTER TERMINATION PROCESSING (WHEN INDICATION CORRECTION IS PERFORMED)

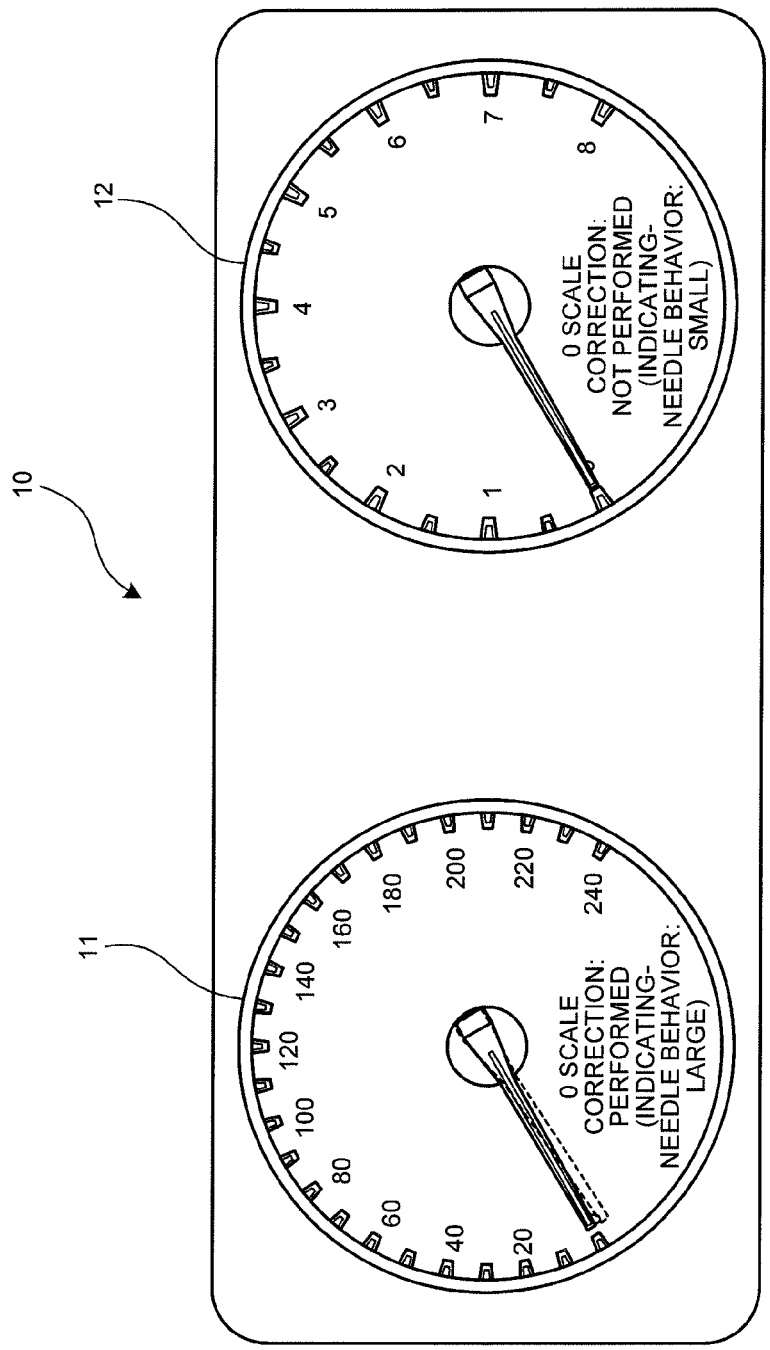

OA: EXCITATION START POSITION
■D: 0 SCALE OUTPUT AFTER ORIGIN RETURN PROCESSING
▲D2: 0 SCALE OUTPUT AFTER TERMINATION PROCESSING

OA: EXCITATION START POSITION
■D: 0 SCALE OUTPUT AFTER ORIGIN RETURN PROCESSING
▲D2: 0 SCALE OUTPUT AFTER TERMINATION PROCESSING

FIG.10A

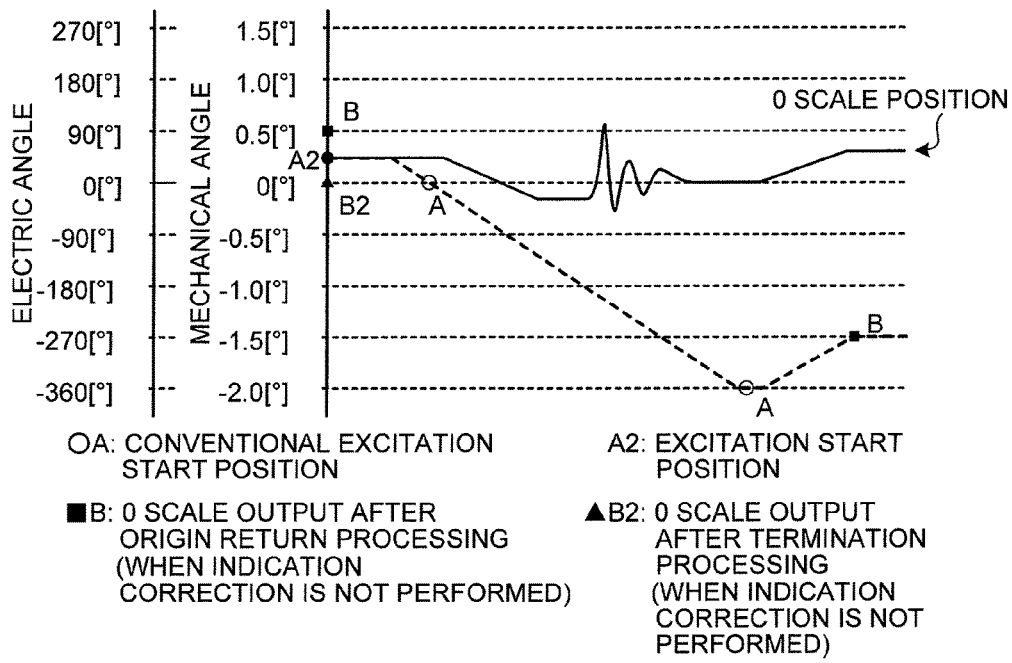

OA: CONVENTIONAL EXCITATION START POSITION

■B: 0 SCALE OUTPUT AFTER ORIGIN RETURN PROCESSING (WHEN INDICATION CORRECTION IS NOT PERFORMED)

A2: EXCITATION START POSITION

▲B2: 0 SCALE OUTPUT AFTER TERMINATION PROCESSING (WHEN INDICATION CORRECTION IS NOT PERFORMED)

FIG.10B

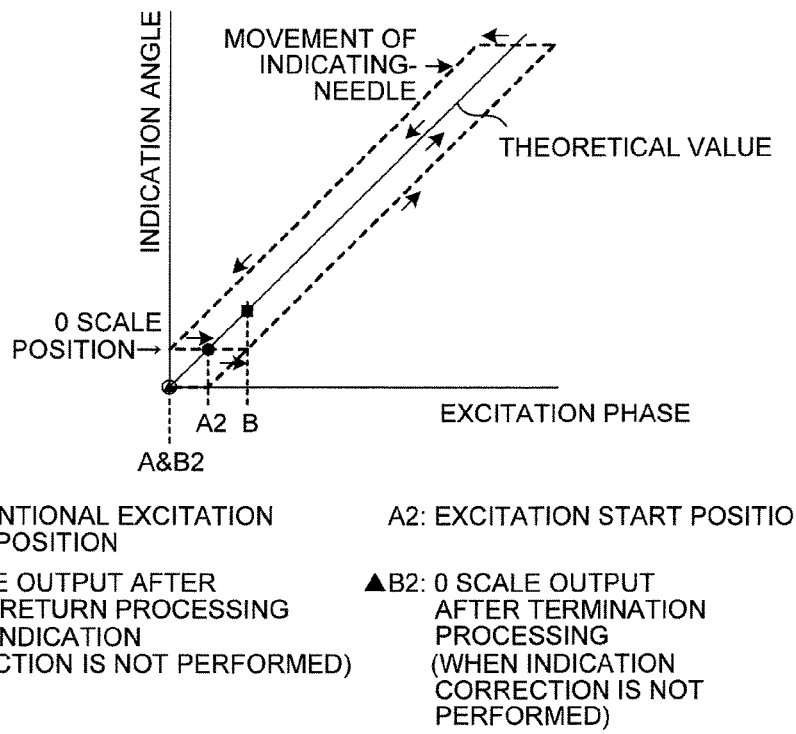

OA: CONVENTIONAL EXCITATION START POSITION

■B: 0 SCALE OUTPUT AFTER ORIGIN RETURN PROCESSING (WHEN INDICATION CORRECTION IS NOT PERFORMED)

A2: EXCITATION START POSITION

▲B2: 0 SCALE OUTPUT AFTER TERMINATION PROCESSING (WHEN INDICATION CORRECTION IS NOT PERFORMED)

FIG.10C

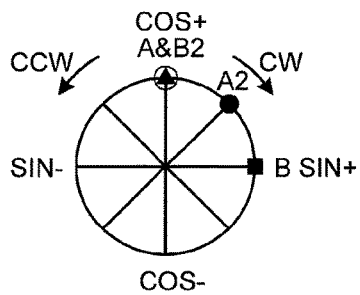

OA: CONVENTIONAL EXCITATION START POSITION

■B: 0 SCALE OUTPUT AFTER ORIGIN RETURN PROCESSING (WHEN INDICATION CORRECTION IS NOT PERFORMED)

A2: EXCITATION START POSITION

▲B2: 0 SCALE OUTPUT AFTER TERMINATION PROCESSING (WHEN INDICATION CORRECTION IS NOT PERFORMED)

FIG.11A

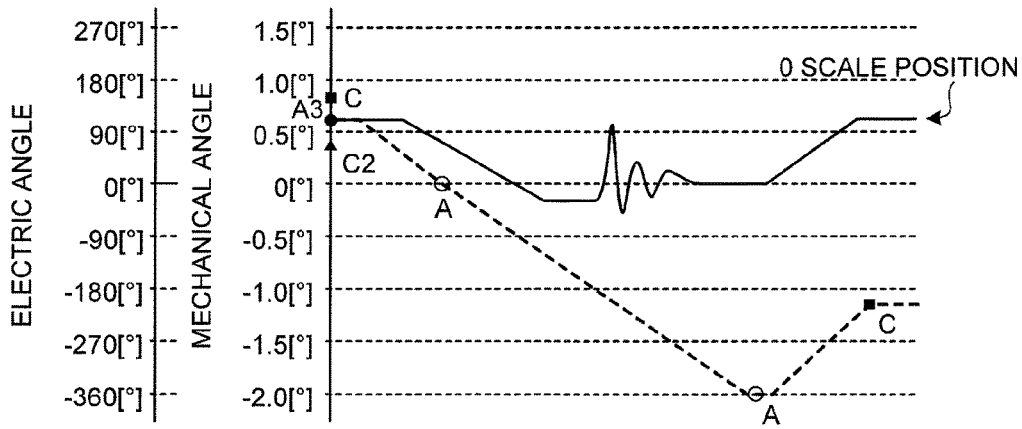

OA: CONVENTIONAL EXCITATION START POSITION

■C: 0 SCALE OUTPUT AFTER ORIGIN RETURN PROCESSING (WHEN INDICATION CORRECTION IS PERFORMED)

A3: EXCITATION START POSITION

▲C2: 0 SCALE OUTPUT AFTER TERMINATION PROCESSING (WHEN INDICATION CORRECTION IS PERFORMED)

FIG.11B

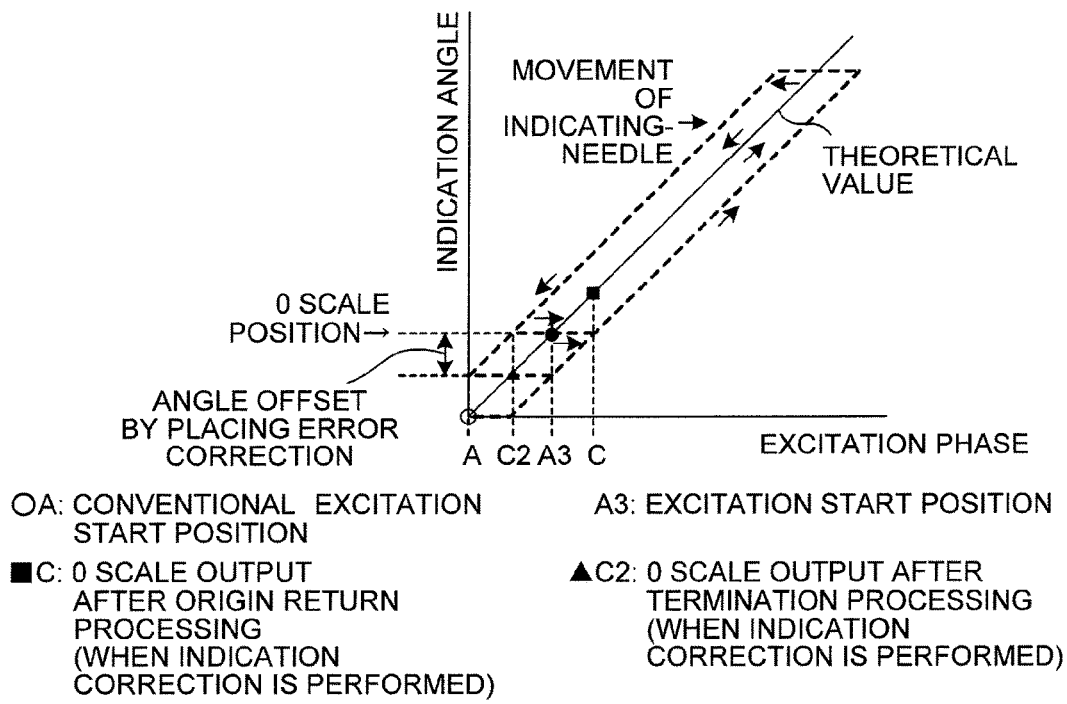

- ○A: CONVENTIONAL EXCITATION START POSITION
- ■C: 0 SCALE OUTPUT AFTER ORIGIN RETURN PROCESSING (WHEN INDICATION CORRECTION IS PERFORMED)
- A3: EXCITATION START POSITION
- ▲C2: 0 SCALE OUTPUT AFTER TERMINATION PROCESSING (WHEN INDICATION CORRECTION IS PERFORMED)

FIG.11C

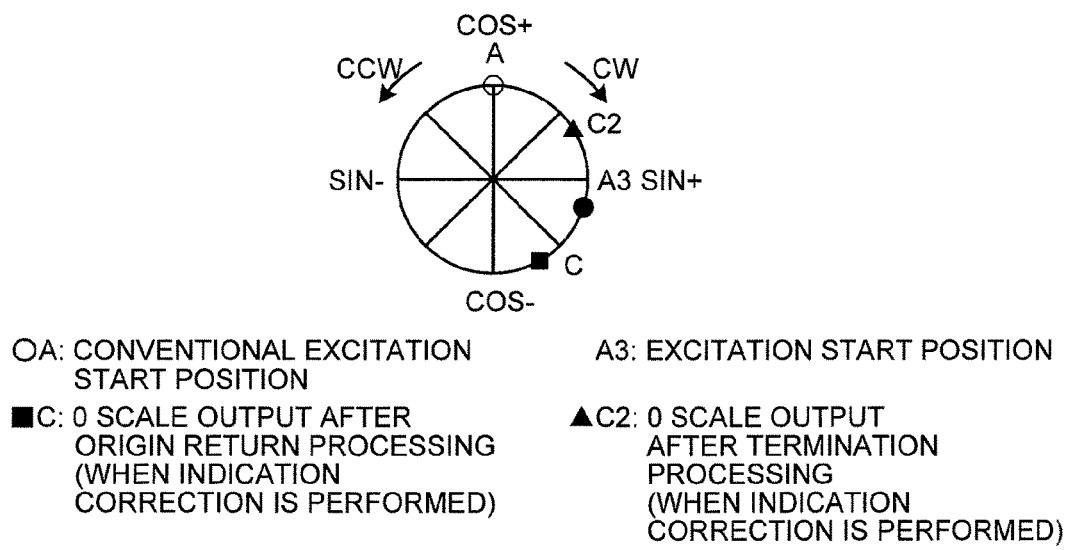

- ○A: CONVENTIONAL EXCITATION START POSITION
- ■C: 0 SCALE OUTPUT AFTER ORIGIN RETURN PROCESSING (WHEN INDICATION CORRECTION IS PERFORMED)
- A3: EXCITATION START POSITION
- ▲C2: 0 SCALE OUTPUT AFTER TERMINATION PROCESSING (WHEN INDICATION CORRECTION IS PERFORMED)

FIG.13C

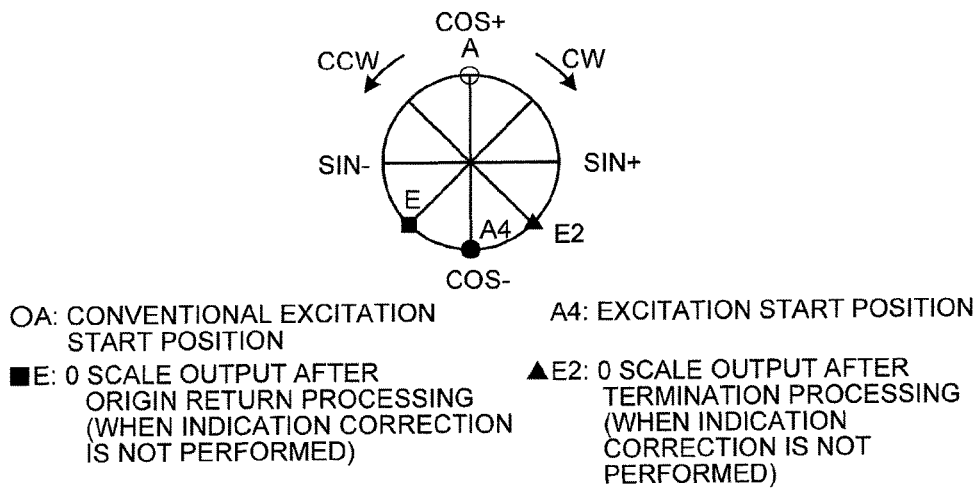

○A: CONVENTIONAL EXCITATION START POSITION
■E: 0 SCALE OUTPUT AFTER ORIGIN RETURN PROCESSING (WHEN INDICATION CORRECTION IS NOT PERFORMED)
A4: EXCITATION START POSITION
▲E2: 0 SCALE OUTPUT AFTER TERMINATION PROCESSING (WHEN INDICATION CORRECTION IS NOT PERFORMED)

FIG.14A

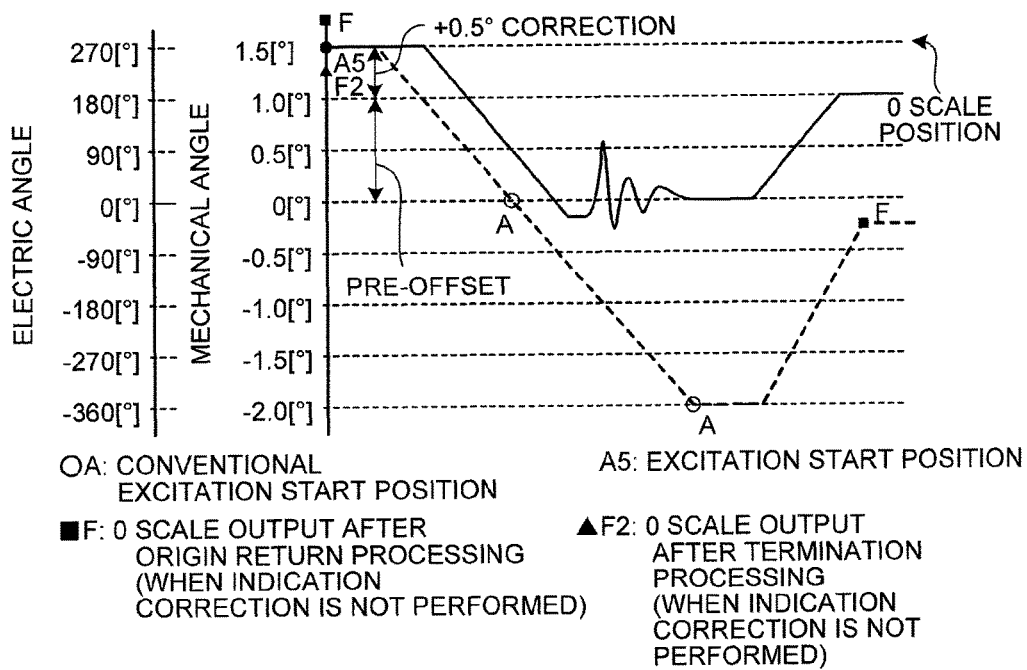

○A: CONVENTIONAL EXCITATION START POSITION
■F: 0 SCALE OUTPUT AFTER ORIGIN RETURN PROCESSING (WHEN INDICATION CORRECTION IS NOT PERFORMED)
A5: EXCITATION START POSITION
▲F2: 0 SCALE OUTPUT AFTER TERMINATION PROCESSING (WHEN INDICATION CORRECTION IS NOT PERFORMED)

FIG.14B

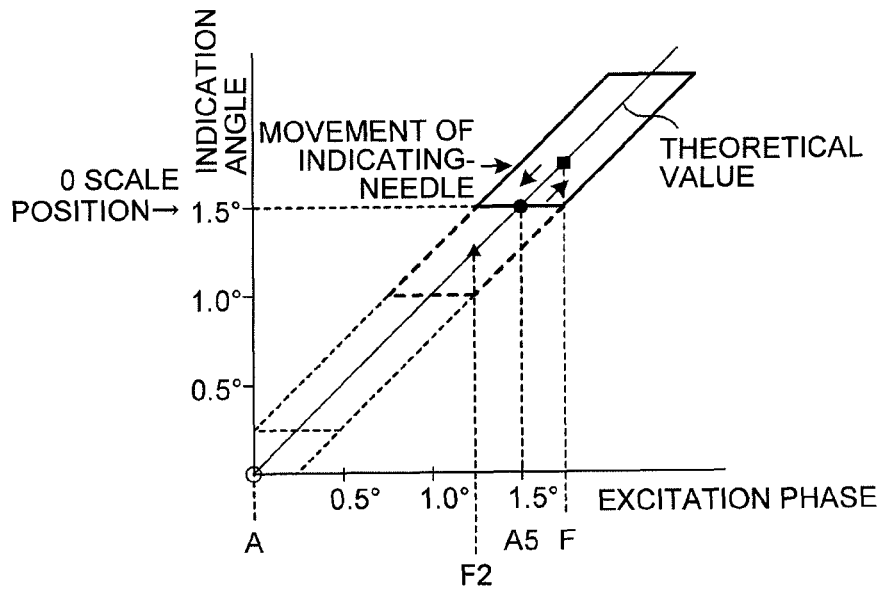

- ⊙A: CONVENTIONAL EXCITATION START POSITION
- ■F: 0 SCALE OUTPUT AFTER ORIGIN RETURN PROCESSING (WHEN INDICATION CORRECTION IS NOT PERFORMED)
- A5: EXCITATION START POSITION
- ▲F2: 0 SCALE OUTPUT AFTER TERMINATION PROCESSING (WHEN INDICATION CORRECTION IS NOT PERFORMED)

FIG.14C

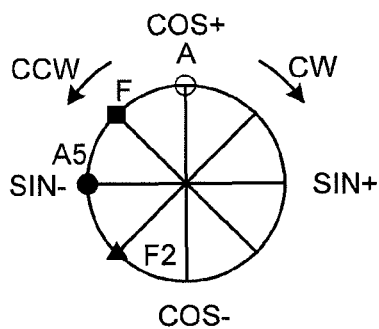

- ⊙A: CONVENTIONAL EXCITATION START POSITION
- ■F: 0 SCALE OUTPUT AFTER ORIGIN RETURN PROCESSING (WHEN INDICATION CORRECTION IS NOT PERFORMED)
- A5: EXCITATION START POSITION
- ▲F2: 0 SCALE OUTPUT AFTER TERMINATION PROCESSING (WHEN INDICATION CORRECTION IS NOT PERFORMED)

OA: CONVENTIONAL EXCITATION START POSITION

■G: 0 SCALE OUTPUT AFTER ORIGIN RETURN PROCESSING (WHEN INDICATION CORRECTION IS NOT PERFORMED)

A6: EXCITATION START POSITION

▲G2: 0 SCALE OUTPUT AFTER TERMINATION PROCESSING (WHEN INDICATION CORRECTION IS NOT PERFORMED)

INDICATING-NEEDLE TYPE METER DEVICE

CROSS-REFERENCE TO RELATED APPLICATION

This application is a continuation application of International Application PCT/JP2014/074115, filed on Sep. 11, 2014, and designating the U.S., the entire contents of which are incorporated herein by reference.

BACKGROUND OF THE INVENTION

1. Field of the Invention

The present invention relates to an indicating-needle type meter device, and in particular to magnetic excitation control of the indicating-needle type meter device that drives an indicating-needle using a stepping motor and a gear mechanism.

2. Description of the Related Art

Japanese Patent No. 4176984 discloses an indicating-needle type meter device that drives an indicating-needle using a stepping motor and a gear mechanism. In the indicating-needle type meter device disclosed in Japanese Patent No. 4176984, a drive shaft of the stepping motor is coupled to a rotating shaft of the indicating-needle via the gear mechanism. When the stepping motor is driven, gears of the gear mechanism are rotated, the rotating shaft of the indicating-needle is rotated, and the direction indicated by the indicating-needle is thus changed. Graduations on a dial plate are arranged at the positions indicated by the tip of the indicating-needle. By appropriately controlling the rotational position of the indicating-needle, instruments including speed meters and tachometers can indicate a measured value with the indicating-needle.

To drive the indicating-needle using the stepping motor, the indicating-needle type meter device sequentially switches an electric current flowing through a plurality of exciting coils housed in the stepping motor, thereby controlling the driving amount in a stepping manner. By controlling an excitation signal to grasp the stepping number in the driving, it is possible to manage the rotational position of the indicating-needle.

Because of some causes, such as vibration of a vehicle and overlap of noise with input data, step-out may possibly temporarily occur in which the input signal to the stepping motor and the actual driving amount do not coincide with each other. If the step-out repeatedly occurs, the control system fails to accurately grasp the actual driving amount. To address this, the indicating-needle type meter device disclosed in Japanese Patent No. 4176984 includes a stopper arranged at a position where a part of the drive system or the indicating-needle (which is hereinafter referred to as an abutting portion, such as a pin-like member) can abut on the stopper. In initialization, such as in application of power, the indicating-needle type meter device rotates the indicating-needle to the position at which the abutting portion abuts on the stopper, thereby grasping the actual position of the indicating-needle with reference to the position.

In transmission of the driving force of the stepping motor to the indicating-needle using the gear mechanism, a difference arises between the driving amount of the control side and the moving amount of the indicating-needle because of an effect of a backlash (gap) present at a position where adjacent gears engage with each other in the gear mechanism. Specifically, in switching of the driving direction, the effect of the backlash temporality prevents the driving force from being transmitted to a control target, thereby causing hysteresis characteristics to appear. To address this, the device disclosed in Japanese Patent No. 4176984 controls the position of the indicating-needle while considering the effect of the backlash.

To prevent positional deviation caused by the effect of the backlash, the indicating-needle type meter device disclosed in Japanese Patent No. 4176984 performs origin return processing in the start of excitation, such as in the application of power. In the origin return processing, the indicating-needle type meter device determines the stopper position at which the abutting portion abuts on the stopper to be an excitation start position for an excitation signal. The indicating-needle type meter device returns the phase of the excitation signal by a predetermined reversal angle from the excitation start position. The indicating-needle type meter device then forwardly rotates the indicating-needle from the state where the abutting portion abuts on the stopper and the gear mechanism is put to one side to a position where the effect of the backlash is eliminated. By using the position as the origin position, the indicating-needle type meter device controls the position of the indicating-needle. The origin position is usually set to a position at which the indicating-needle indicates a 0 graduation position. The reversal angle is set to a value equal to or larger than an angle corresponding to a control period of the excitation signal required to eliminate the hysteresis characteristics.

With the origin return processing, the indicating-needle is reliably positioned at the origin position apart from the stopper position by the predetermined angle in the start of excitation. After the origin return processing is executed, normal control is performed on the position of the indicating-needle. In the normal control on the position of the indicating-needle, the indicating-needle type meter device performs control on the position of the indicating-needle while considering the backlash amount, thereby accurately positioning the indicating-needle at a target position.

To terminate the excitation after performing the normal indication control with the indicating-needle, the indicating-needle type meter device returns the phase of the excitation signal such that the indicating-needle is rotated in a backward direction to be positioned at the origin position, and then stops the excitation to the stepping motor. With the termination processing, the indicating-needle is positioned and stopped at the origin position with the abutting portion abutting on the stopper and with the gear mechanism put to one side. As a result, the indicating-needle is positioned at the origin position before the start of next excitation.

As described above, in the method for controlling the indicating-needle described in Japanese Patent No. 4176984, the indicating-needle is positioned at the origin position before the start of excitation. When resuming the excitation, the indicating-needle type meter device starts excitation control by setting the phase of the excitation signal at the excitation start position (control origin) and positioning the indicating-needle at the stopper position. As a result, the indicating-needle drastically moves from the origin position to the stopper position in the start of excitation. Such behavior of the indicating-needle may possibly be recognized as an unnatural movement by a driver who is viewing it.

To attach such an indicating-needle type meter device, it is necessary to place the indicating-needle into a predetermined position of a rotating shaft and press-fit and fix it. Recently, indicating-needle caps having special shapes have been employed, making positional deviation more likely to occur in the placing. To address such positional deviation of the indicating-needle, adjustment control is performed after the press-fitting of the indicating-needle as disclosed in Japanese Patent No. 4176984. It is thus possible to correct the position of the indicating-needle so as to prevent positional deviation with respect to the scale position. Specifically, the indicating-needle is originally driven such that the stopper position is apart from the origin position by a backlash angle corresponding to the backlash amount. By contrast, the technology disclosed in Japanese Patent No. 4176984 drives the indicating-needle such that the stopper position is apart from the origin position by an angle larger than the backlash angle. After the placing of the indicating-needle, the difference between the angles is measured to perform positional control on the indicating-needle using the measured value as a placing error. If indication adjustment is performed to correct the placing error, the stopper position is further apart from the origin position compared with a case where no indication adjustment is performed. As a result, the amount of drastic movement of the indicating-needle is further increased in the start of excitation.

One meter unit frequently includes a plurality of instruments, such as a speed meter and a tachometer. If the correction of the placing error described above is performed on each of the instruments, the behaviors of the respective indicating-needles may possibly differ from one another in the start of excitation because the placing error amounts are different between the instruments. Also with this difference, the behaviors of the indicating-needles are more likely to be recognized as unnatural movements. In addition, the correction of the placing error may possibly not be performed on some of the instruments.

If the correction amount of the placing error is larger than the amount corresponding to a half period of the excitation signal, the indicating-needle initially moves from the origin position not in the backward direction corresponding to the stopper direction but in the forward direction and then moves in the stopper direction, that is, jumping occurs. To prevent the jumping, it is conventionally necessary to make the correction amount of the placing error smaller than the amount corresponding to a half period of the excitation signal.

Because of these circumstances, there have recently been demands for the indicating-needle type meter devices that can prevent an unnatural behavior of the indicating-needle in the start of excitation.

As described above, the technology disclosed in Japanese Patent No. 4176984 places the indicating-needle such that the stopper position is apart from the origin position by an angle larger than the backlash angle corresponding to a predetermined separation amount. After the placing of the indicating-needle, the difference between the angles is measured to perform positional control on the indicating-needle using the measured value as a placing error. The method described in Japanese Patent No. 4176984, however, can permit a placing error in a direction in which the stopper position is away from the origin position but cannot permit a placing error in a direction in which the stopper position is closer to the origin position. Therefore, an operator (manufacturing apparatus) that performs the placing operation of the indicating-needle needs to place the indicating-needle into a position on the side in a specific direction with respect to the predetermined position. Consequently, there have recently been demands for the indicating-needle type meter devices that can increase the degree of freedom in correction of the placing error.

SUMMARY OF THE INVENTION

In view of the circumstances described above, it is an object of the present invention to provide an indicating-needle type meter device that can increase the degree of freedom in correction of a placing error.

The object described above according to the present invention is achieved by the following configuration.

(1) An indicating-needle type meter device includes a controller; a stepping motor driven to rotate according to a phase of an excitation signal received from the controller; an indicating-needle that rotates in both forward and backward directions in response to rotation of the stepping motor; and a gear mechanism that transmits rotational driving force of the stepping motor to the indicating-needle, wherein the indicating-needle or the gear mechanism includes an abutting portion that abuts on a stopper when the indicating-needle is positioned at a predetermined rotational position, the controller performs, when starting excitation of the stepping motor, origin return processing of: setting the phase of the excitation signal to a predetermined excitation start position, returning the phase of the excitation signal by a predetermined reversal angle such that the indicating-needle rotates in the backward direction corresponding to a direction in which the abutting portion comes closer to the stopper, thereby positioning the indicating-needle at a stopper position at which the abutting portion abuts on the stopper, and advancing the phase of the excitation signal by an origin return angle set based on a backlash angle corresponding to a backlash amount in the gear mechanism, thereby rotating the indicating-needle in the forward direction to an origin position apart from the stopper position by a predetermined angle and thus positioning the indicating-needle at the origin position, the controller performs, when terminating excitation of the stepping motor, termination processing of returning the phase of the excitation signal such that the indicating-needle rotates in the backward direction to be positioned at the origin position, and the origin return angle is an angle obtained by adding the backlash angle, a predetermined positive pre-offset angle, and a positive or negative placing error correction angle set based on a placing error of the indicating-needle with respect to the stopper.

The indicating-needle type meter device according to (1) can permit the placing error of the indicating-needle with respect to the stopper in the forward direction and the backward direction because the predetermined positive pre-offset angle is added to the origin return angle. This configuration enables, in the placing operation of the indicating-needle, the operator to place the indicating-needle into positions on both sides in the forward and backward directions with respect to the predetermined position. It is thus possible to increase the degree of freedom in correction of the placing error.

(2) The indicating-needle type meter device according to (1), further includes a first instrument and a second instrument, wherein the indicating-needle is provided to the first instrument and the second instrument as a first indicating-needle and a second indicating-needle, respectively, and the pre-offset angle is different between the first indicating-needle and the second indicating-needle.

The indicating-needle type meter device according to (2) can set the behavior of the indicating-needle individually for the first indicating-needle and the second indicating-needle. Even in a case where the first instrument and the second instrument having indicating-needles greatly different from each other in the design and the structure are combined, the indicating-needle type meter device can adjust the behaviors of the indicating-needles. Different pre-offset angles may be set for each group depending on the length and the design of the indicating-needles, for example. The pre-offset angle for the instruments having a long indicating-needle, such as the speed meter and the tachometer, may be set smaller than the pre-offset angle for the instruments having a short indicating-needle, such as the fuel gauge and the water-temperature gauge.

The object described above according to the present invention is achieved by the following configuration.

(3) An indicating-needle type meter device includes a controller; a stepping motor driven to rotate according to a phase of an excitation signal received from the controller; an indicating-needle that rotates in both forward and backward directions in response to rotation of the stepping motor; and a gear mechanism that transmits rotational driving force of the stepping motor to the indicating-needle, wherein the indicating-needle or the gear mechanism includes an abutting portion that abuts on a stopper when the indicating-needle is positioned at a predetermined rotational position, the controller performs, when starting excitation of the stepping motor, origin return processing of: setting the phase of the excitation signal to a predetermined excitation start position, returning the phase of the excitation signal by a predetermined reversal angle such that the indicating-needle rotates in the backward direction corresponding to a direction in which the abutting portion comes closer to the stopper, thereby positioning the indicating-needle at a stopper position at which the abutting portion abuts on the stopper, and advancing the phase of the excitation signal by an origin return angle set based on a backlash angle corresponding to a backlash amount in the gear mechanism, thereby rotating the indicating-needle in the forward direction to an origin position apart from the stopper position by a predetermined angle and thus positioning the indicating-needle at the origin position, the controller performs, when terminating excitation of the stepping motor, termination processing of returning the phase of the excitation signal such that the indicating-needle rotates in the backward direction to be positioned at the origin position, and the excitation start position is a position advanced from the phase of the excitation signal after execution of the termination processing by a start-time correction angle smaller than the backlash angle.

(4) The indicating-needle type meter device according to (3), wherein the start-time correction angle is approximately a half of the backlash angle.

(5) The indicating-needle type meter device according to (3) or (4), wherein the origin return angle is an angle obtained by adding the backlash angle and a positive placing error correction angle set based on a placing error of the indicating-needle with respect to the stopper.

(6) The indicating-needle type meter device according to any one of (3) to (5), wherein the origin return angle is an angle obtained by adding the backlash angle, a positive or negative placing error correction angle set based on a placing error of the indicating-needle with respect to the stopper, and a predetermined positive pre-offset angle.

(7) The indicating-needle type meter device according to (3) or (4), wherein the reversal angle is an angle obtained by adding a basic reversal angle set to a value equal to or larger than an angle corresponding to a control period of the excitation signal and the start-time correction angle, and when returning the phase of the excitation signal by the reversal angle in the origin return processing, the controller first returns the phase of the excitation signal by the start-time correction angle, waits for a predetermined time, and then further returns the phase of the excitation signal by the basic reversal angle.

The present invention has been briefly described. By reading through the embodiments below to embody the invention described below (hereinafter, referred to as "embodiments") with reference to the accompanying drawings, it is possible to further specify details of the present invention.

BRIEF DESCRIPTION OF THE DRAWINGS

FIG. 6A is a diagram illustrating an example of origin return processing in the case of conventional excitation control and illustrating a temporal change in the excitation signal and the rotation angle of an indicating-needle;

FIG. 6B is a diagram illustrating an example of the origin return processing in the case of conventional excitation control and illustrating the relation between the phase of the excitation signal and the rotation angle of the indicating-needle;

FIG. 6C is a diagram illustrating an example of the origin return processing in the case of conventional excitation control and a vector diagram illustrating the phase of the excitation signal;

FIG. 7A is a diagram illustrating an example of the origin return processing in a case where correction of a placing error is performed by the conventional excitation control and illustrating a temporal change in the excitation signal and the rotation angle of the indicating-needle;

FIG. 7B is a diagram illustrating an example of the origin return processing in a case where correction of the placing error is performed by the conventional excitation control and illustrating the relation between the phase of the excitation signal and the rotation angle of the indicating-needle;

FIG. 7C is a diagram illustrating an example of the origin return processing in a case where correction of the placing error is performed by the conventional excitation control and a vector diagram illustrating the position of a rotor;

FIG. 8 is a view for explaining a difference in the behavior between indicating-needles in the start of excitation;

FIG. 10A is a diagram illustrating an example of the origin return processing in the case of excitation control performed by the indicating-needle type meter device according to the first embodiment and illustrating a temporal change in the excitation signal and the rotation angle of the indicating-needle;

FIG. 10B is a diagram illustrating an example of the origin return processing in the case of excitation control performed by the indicating-needle type meter device according to the first embodiment and illustrating the relation between the phase of the excitation signal and the rotation angle of the indicating-needle;

FIG. 10C is a diagram illustrating an example of the origin return processing in the case of excitation control performed by the indicating-needle type meter device according to the first embodiment and a vector diagram illustrating the phase of the excitation signal;

FIG. 11A is a diagram illustrating an example of the origin return processing in a case where correction of the placing error is performed by the excitation control performed by the indicating-needle type meter device according to the first embodiment and illustrating a temporal change in the excitation signal and the rotation angle of the indicating-needle;

FIG. 11B is a diagram illustrating an example of the origin return processing in a case where correction of the placing error is performed by the excitation control performed by the indicating-needle type meter device according to the first embodiment and illustrating the relation between the phase of the excitation signal and the rotation angle of the indicating-needle;

FIG. 11C is a diagram illustrating an example of the origin return processing in a case where correction of the placing error is performed by the excitation control performed by the indicating-needle type meter device according to the first embodiment and a vector diagram illustrating the phase of the excitation signal;

FIG. 13C is a diagram illustrating an example of the origin return processing in the case of the indicating-needle type meter device according to the second embodiment and a vector diagram illustrating the phase of the excitation signal;

FIG. 14A is a diagram illustrating an example of the origin return processing in a case where correction of the placing error is performed in a forward direction by the excitation control performed by the indicating-needle type meter device according to the second embodiment and illustrating a temporal change in the excitation signal and the rotation angle of the indicating-needle;

FIG. 14B is a diagram illustrating an example of the origin return processing in a case where correction of the placing error is performed in the forward direction by the excitation control performed by the indicating-needle type meter device according to the second embodiment and illustrating the relation between the phase of the excitation signal and the rotation angle of the indicating-needle;

FIG. 14C is a diagram illustrating an example of the origin return processing in a case where correction of the placing error is performed in the forward direction by the excitation control performed by the indicating-needle type meter device according to the second embodiment and a vector diagram illustrating the phase of the excitation signal;

DETAILED DESCRIPTION OF THE PREFERRED EMBODIMENTS

Specific embodiments of an indicating-needle type meter device according to the present invention are described below with reference to the accompanying drawings.

First Embodiment

Explanation of the Outline of the Device

<Appearance of the Indicating-Needle Type Meter Device

Figure 1:
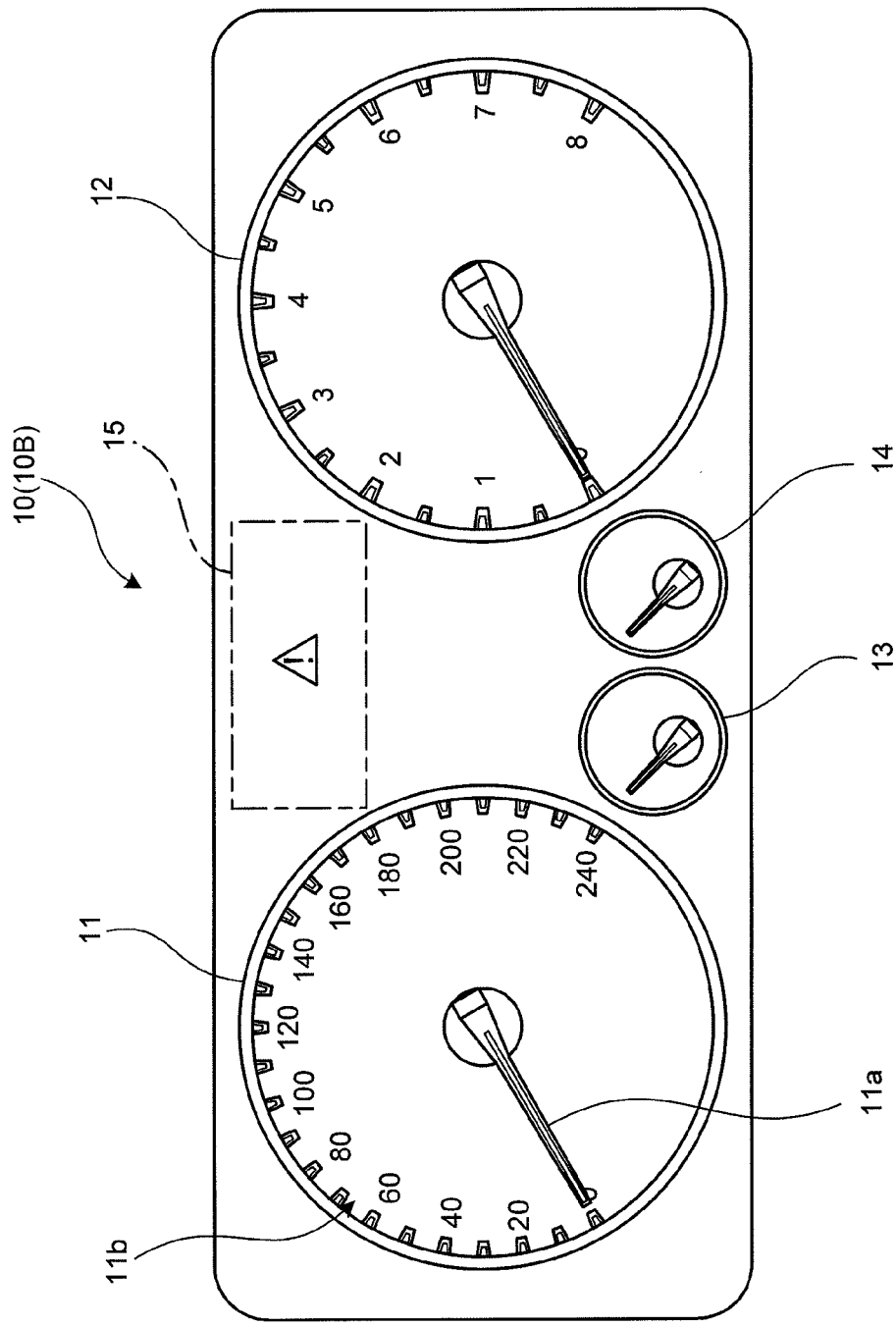
FIG. 1 is a front view illustrating a specific example of an appearance of an indicating-needle type meter device according to a first embodiment.

FIG. 1 illustrates a specific example of an appearance of an indicating-needle type meter device 10.

The indicating-needle type meter device 10 illustrated in FIG. 1 is used as a meter unit mounted on a vehicle. The indicating-needle type meter device 10 includes a speed meter 11, a tachometer 12, a fuel gauge 13, and a water-temperature gauge 14, which are main instruments in a vehicle. The indicating-needle type meter device 10 further includes a warning display unit 15 that displays various warnings.

The speed meter 11 includes an indicating-needle 11a and scales 11b. The indicating-needle 11a can rotate in forward and backward directions about the center portion of a circular dial plate. The scales 11b are formed along the periphery of the dial plate. The rotational position of the indicating-needle 11a is controlled such that the indicating-needle 11a indicates a certain position on the scales 11b, whereby the speed meter 11 indicates the present speed of the vehicle. The tachometer 12, the fuel gauge 13, and the water-temperature gauge 14 each include scales that display various state quantities of the vehicle and a indicating-needle that can rotate similarly to the speed meter 11.

The warning display unit 15 is used to light up a warning lamp and display various types of information to be given to a driver in response to an abnormality occurring in the vehicle, for example.

<Example of the Configuration of the Electric Circuit>

Figure 2:
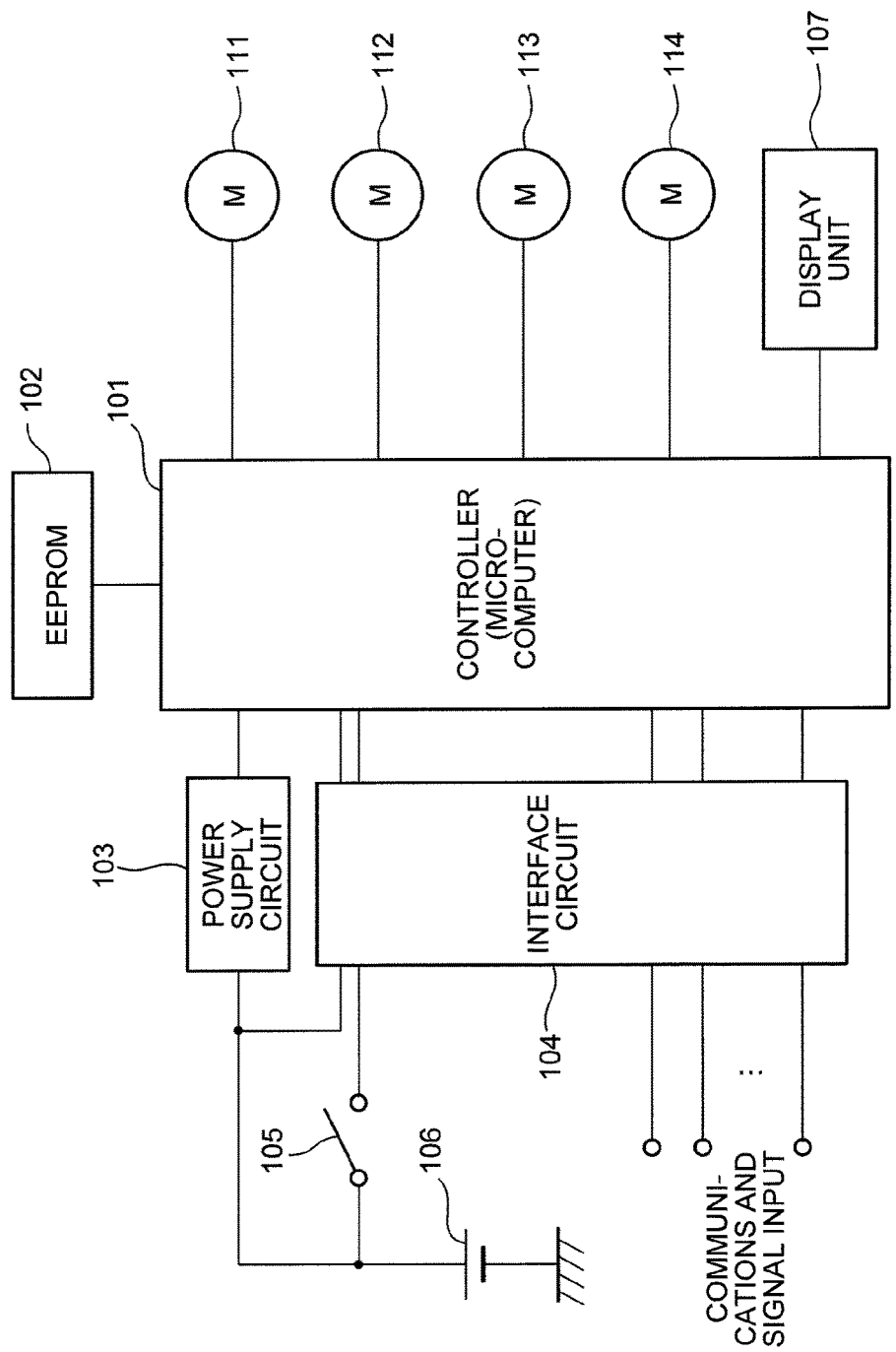
FIG. 2 is a block diagram illustrating an example of a configuration of an electric circuit of the indicating-needle type meter device illustrated in FIG. 1.

FIG. 2 illustrates an example of a configuration of an electric circuit of the indicating-needle type meter device 10.

As illustrated in FIG. 2, the indicating-needle type meter device 10 includes a controller (microcomputer) 101, a non-volatile memory 102, a power supply circuit 103, an interface circuit 104, a display unit 107, and four stepping motors 111 to 114.

The controller 101 is a central processing unit (CPU), for example. The controller 101 executes computer programs incorporated in advance, thereby collectively controlling the indicating-needle type meter device 10.

The non-volatile memory 102 is an electrically erasable programmable read-only memory (EEPROM), for example. The non-volatile memory 102 stores therein computer programs executed by the controller 101 and various constants used in various types of control. A part of the data on the non-volatile memory 102 is sequentially updated as needed by access from the controller 101.

The power supply circuit 103 uses electric power supplied from an on-vehicle battery 106 to generate a stabilized power supply voltage required for the indicating-needle type meter device 10.

The interface circuit 104 receives various communications and signals output from the vehicle and converts them into signals that can be processed by the controller 101. A signal output from an ignition switch 105, for example, is received by the controller 101 via the interface circuit 104. The display unit 107 includes a display screen serving as a liquid-crystal display panel, a display lamp, and other components and can display various types of information.

The four stepping motors 111, 112, 113, and 114 are used to drive the indicating-needles of the speed meter 11, the tachometer 12, the fuel gauge 13, and the water-temperature gauge 14 illustrated in FIG. 1, respectively. The stepping motors 111, 112, 113, and 114 are connected to the output side of the controller 101 and are driven to rotate in response to control signals from the controller 101. In the actual configuration, the controller 101 and the stepping motors 111 to 114 are connected via a predetermined driver circuit that controls a conduction state of exciting coils, which is not illustrated in FIG. 2.

<Example of the Configuration of the Drive Mechanism>

Figure 3A:
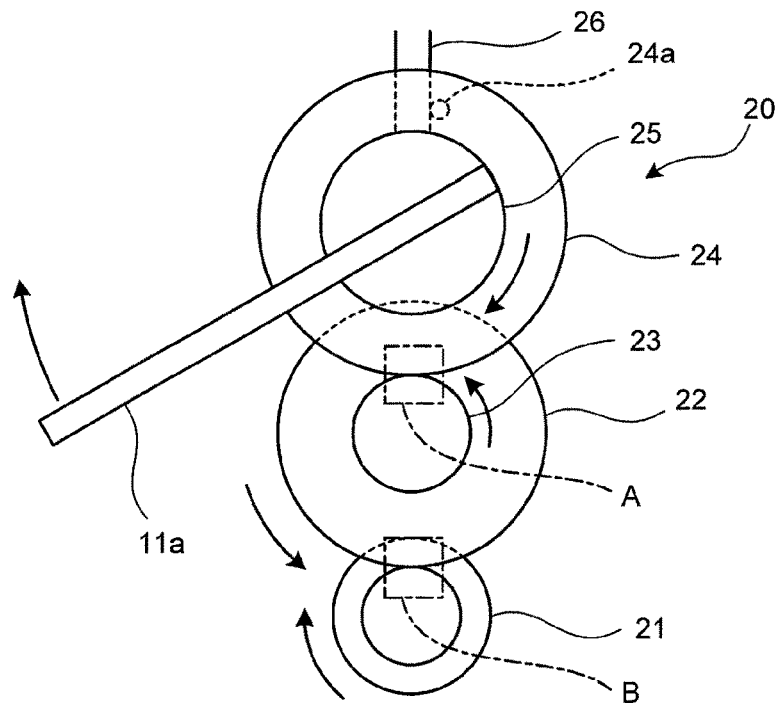
FIG. 3A is a view illustrating a specific example of a configuration of a drive mechanism of the indicating-needle type meter device illustrated in FIG. 1.
Figure 3B:
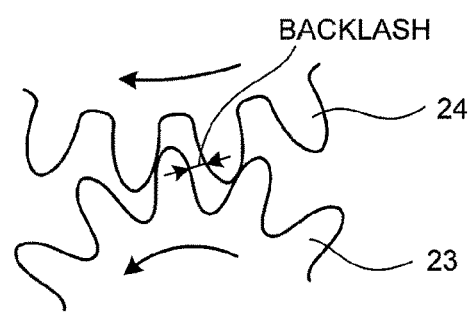
FIG. 3B is a view illustrating a specific example of the configuration of the drive mechanism of the indicating-needle type meter device illustrated in FIG. 1.
Figure 3C:
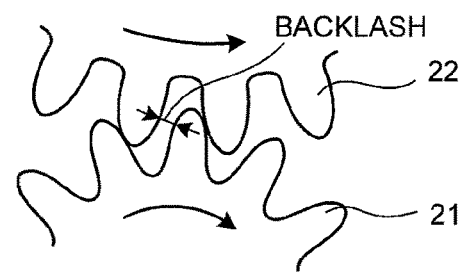
FIG. 3C is a view illustrating a specific example of the configuration of the drive mechanism of the indicating-needle type meter device illustrated in FIG. 1.

FIGS. 3A, 3B, and 3C illustrate a specific example of a configuration of a drive mechanism of the indicating-needle type meter device 10. FIG. 3B is a view of the portion inside the enclosing line A in FIG. 3A, and FIG. 3C is a view of the portion inside the enclosing line B in FIG. 3A. The output shaft of the stepping motor 111 and the indicating-needle 11a of the speed meter 11 are mechanically coupled via a gear mechanism 20 having the configuration illustrated in FIG. 3A. As illustrated in FIG. 3A, the gear mechanism 20 includes a rotor gear 21, intermediate gears 22 and 23, and an output gear 24.

The rotor gear 21 is coaxially coupled to the output shaft of the stepping motor 111. In the gear mechanism 20, the rotor gear 21 and the intermediate gear 22 are arranged at positions adjacent to each other with teeth formed on their peripheries engaging with each other.

In the gear mechanism 20, the intermediate gear 23 is coaxially coupled to the rotating shaft of the intermediate gear 22. In the gear mechanism 20, the intermediate gear 23 and the output gear 24 are arranged at positions adjacent to each other with teeth formed on their peripheries engaging with each other.

A base of the indicating-needle 11a is press-fitted and fixed to a rotating shaft 25 coupled to the center of the output gear 24. In the gear mechanism 20, the indicating-needle 11a is rotated along with rotation of the output gear 24.

In other words, when the stepping motor 111 is driven, the rotor gear 21 rotates in the gear mechanism 20. The driving force of the rotor gear 21 is sequentially transmitted to the intermediate gear 22, the intermediate gear 23, and the output gear 24, thereby driving the indicating-needle 11a.

In the gear mechanism 20, backlashes (gaps) required for smooth rotation of the gears are present at meshing portions between the rotor gear 21 and the intermediate gear 22 and between the intermediate gear 23 and the output gear 24 (refer to FIGS. 3B and 3C, for example).

As illustrated in FIG. 3A, the output gear 24 includes a stopper pin 24a (abutting portion) fixed thereon. In the gear mechanism 20, the position of the stopper pin 24a is changed along with the rotation of the output gear 24. The case of the indicating-needle type meter device 10 includes a stopper 26 fixed to a predetermined position. The position at which the stopper 26 is arranged is present on a movement path of the stopper pin 24a. When the output gear 24 continues to rotate, the stopper pin 24a abuts on the stopper 26 at a predetermined rotational position, thereby stopping the rotation of the output gear 24 in this state. Therefore, it is possible to manage the position of a moving portion, such as the indicating-needle 11a, using the position at which the stopper pin 24a abuts on the stopper 26 as a reference. In the present embodiment, the stopper pin 24a serving as the abutting portion is fixed on the output gear 24, that is, the gear mechanism 20 includes the abutting portion. In a case where a stopper pin is formed on a back surface of a cap, however, the indicating-needle 11a can be considered to include the abutting portion. Alternatively, the abutting portion may be provided in a manner extending from the indicating-needle 11a.

<Example of the Configuration of the Stepping Motor>

Figure 4:
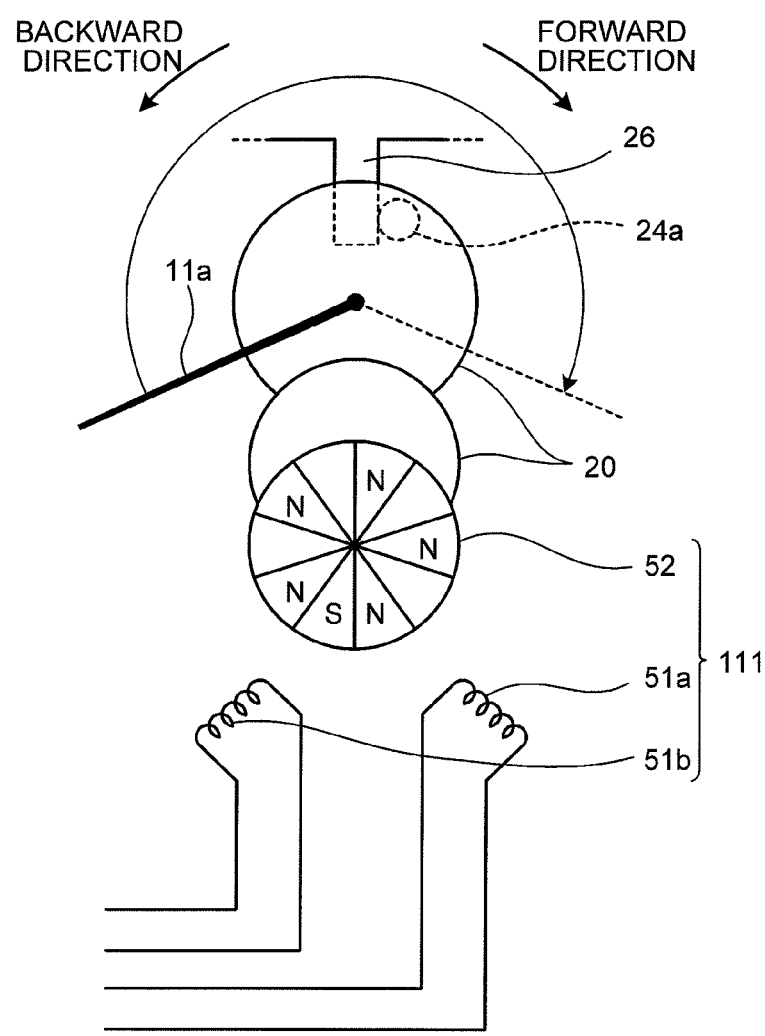
FIG. 4 is a block diagram illustrating an example of a configuration of the drive mechanism including a stepping motor.

FIG. 4 illustrates an example of the configuration of the drive mechanism including the stepping motor 111.

As illustrated in FIG. 4, the stepping motor 111 includes independent two-phased exciting coils 51a and 51b and a rotor 52. In the rotor 52, N-poles and S-poles of a permanent magnet are alternately arranged in the circumferential direction as illustrated in FIG. 4.

With this configuration, the rotor 52 can be driven to rotate by magnetic attraction force or magnetic repulsion force generated between a magnetic field formed by an electric current flowing through the two-phased exciting coils 51a and 51b and the poles of the permanent magnet of the rotor 52.

<Specific Example of the Excitation Signal>

Figure 5:
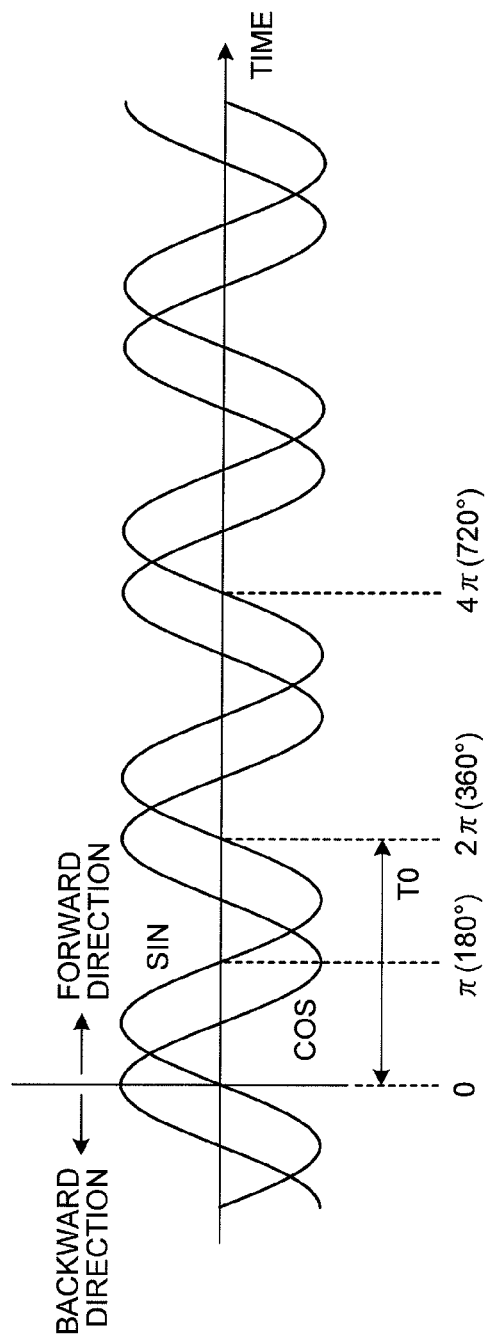
FIG. 5 is a timing chart illustrating a specific example of an excitation signal for driving the stepping motor.

FIG. 5 illustrates a specific example of the excitation signal for driving the stepping motor 111.

By using two-phased excitation signals SIN and COS having a phase difference of 90 degrees ($\pi/2$[rad]) as illustrated in FIG. 5, it is possible to control the rotation amount and the rotation direction of the stepping motor 111. Specifically, the stepping motor 111 is driven by supplying the excitation signal SIN having a sine waveform to the exciting coil 51a and supplying the excitation signal COS having a cosine waveform to the exciting coil 51b. Furthermore, the rotation direction of the rotor 52 is switched by switching lead/lag of the phase of the excitation signal SIN or COS.

A control period T0 of the excitation signal is equal to one period of the waveforms of the excitation signals SIN and COS. By outputting the excitation signals SIN and COS such that the control period T0 is repeated as illustrated in FIG. 5, it is possible to consecutively or intermittently drive the stepping motor 111. Furthermore, by performing phase control within 2π[rad] of the excitation signals SIN and COS, it is possible to precisely control the rotational position within the control period T0.

<Explanation of the Behavior of the Indicating-Needle Caused in the Start of Excitation in the Conventional Excitation Control>

The following describes the behavior of the indicating-needle in the start of excitation in a case where the conventional excitation control is performed with reference to FIGS. 6A, 6B, and 6C. FIGS. 6A, 6B, and 6C are diagrams illustrating an example of origin return processing in the case of the conventional excitation control. FIG. 6A is a diagram illustrating a temporal change in the excitation signal and the rotation angle of the indicating-needle. FIG. 6B is a diagram illustrating the relation between the phase of the excitation signal and the rotation angle of the indicating-needle. FIG. 6C is a vector diagram illustrating the phase of the excitation signal. In FIGS. 6A, 6B, and 6C, the behavior of the indicating-needle is indicated by the solid line, and the phase of the excitation signal is indicated by the broken line. This rule is also applied to FIGS. 7A, 7B, and 7C, and FIGS. 9A and 9B to FIGS. 14A, 14B, and 14C. While the indicating-needle 11a of the speed meter 11 is a control target in the description below, the same control is performed on the respective indicating-needles of the other instruments including the tachometer 12, the fuel gauge 13, and the water-temperature gauge 14.

The contents illustrated in FIG. 6 will be described. In this example, as illustrated in FIGS. 6A, 6B, and 6C, an electric angle of 360 degrees (2π[rad]) corresponding to the control period T0 of the excitation signal corresponds to two changes in the mechanical angle. In other words, when the phase of the excitation signal is changed by one period by the control on the excitation signals SIN and COS, the rotation angle of the indicating-needle 11a corresponding to the mechanical angle changes 2 degrees.

The positions P1, P2, P3, and P4 illustrated in the vector diagram in FIG. 6C correspond to the following points.
P1: the position at which the excitation signal COS takes the positive maximum value, and SIN takes 0
P2: the position at which the excitation signal SIN takes the positive maximum value, and COS takes 0
P3: the position at which the excitation signal COS takes the negative maximum value, and SIN takes 0
P4: the position at which the excitation signal SIN takes the negative maximum value, and COS takes 0

By controlling the drive of the stepping motor 111 using the excitation signals SIN and COS, it is possible to position the rotor 52 at the positions P1, P2, P3, and P4. By switching the phase of the excitation signal, it is possible to switch the rotation direction between CW (clockwise direction, forward direction) and CCW (counterclockwise direction, backward direction).

The relation between the phase of the excitation signal output from the controller 101 and the rotation angle (indication angle) of the indicating-needle 11a ideally has a linear shape like the line indicated as a "theoretical value" in FIG. 6B. In the actual operation, however, the effect of the backlash in the gear mechanism 20 causes an indication error, thereby deviating the actual movement of the indicating-needle from the "theoretical value". If the control is performed in order of I to V illustrated in FIG. 6B, the indicating-needle moves as follows.
Section I: Even if the phase of the excitation signal is increased from 0, the indication angle does not change and remains 0 while the effect of the backlash is present.
Section II: The indication angle increases in proportion to the increase in the phase angle of the excitation signal.
Section III: Even if the phase angle of the excitation signal is decreased, the indication angle does not change while the effect of the backlash is present.
Section IV: The indication angle decreases in proportion to the decrease in the phase angle of the excitation signal.
Section V: Even if the phase angle of the excitation signal is increased from 0, the indication angle does not change while the effect of the backlash is present.

As a result, an indication error β corresponding to the backlash amount occurs between the "theoretical value" and the actual indication angle of the indicating-needle 11a. Furthermore, an indication error α occurs between the origin position at which the indicating-needle indicates the position of "0" in the scales and the stopper position at which the stopper pin 24a abuts on the stopper 26. In the conventional control, as illustrated in FIGS. 6A, 6B, and 6C, the gap between the origin position and the stopper position is set equal to the indication error α occurring because of the backlash to perform the origin return processing in the start of excitation.

The following describes specific contents of the control performed in the start of excitation.

To reset positional deviation caused by step-out, the origin return processing is performed in the start of excitation. In the origin return processing, the position indicated by A in FIGS. 6A, 6B, and 6C is determined to be an excitation start position for the excitation signal. Subsequently, the phase of the excitation signal is returned by a predetermined reversal angle from the excitation start position as illustrated in FIG. 6A to rotate the indicating-needle 11a to the stopper position at which the stopper pin 24a abuts on the stopper 26. At this time, the gear mechanism 20 is put to one side. Subsequently, the indicating-needle 11a is forwardly rotated (rotated in the clockwise direction) from the state of being put to one side to a position where the effect of the backlash is eliminated. The position is used as the origin position (0 scale position) to control the position of the indicating-needle 11a. After the origin return processing is performed, the phase of the excitation signal is at the position indicated by B in FIGS. 6A, 6B, and 6C. In other words, the angle from B to the excitation start position A is an origin return angle corresponding to the angle from the excitation start position to the position after the execution of the origin return processing. In the example illustrated in FIGS. 6A, 6B, and 6C, the origin return angle is equal to the backlash angle corresponding to the backlash amount in the gear mechanism 20. The reversal angle is set to a value equal to or larger than an angle corresponding to the control period T0 of the excitation signal required to eliminate the hysteresis characteristics. In this example, the reversal angle is a basic reversal angle of 360 degrees (2π[rad]) corresponding to the control period T0.

To terminate the excitation after the normal indicating-needle control is performed, the phase of the excitation signal is returned such that the indicating-needle 11a is rotated in the backward direction to be positioned at the origin position (0 scale position) (as indicated by IV in FIG. 6B). Subsequently, the excitation to the stepping motor 111 is stopped. At this time, the phase of the excitation signal is at the position indicated by B2 in FIGS. 6A, 6B, and 6C. With the termination processing, the indicating-needle 11a is positioned and stopped at the origin position with the stopper pin 24a abutting on the stopper 26 and with the gear mechanism 20 put to one side. As a result, the indicating-needle 11a is positioned at the origin position before the start of next excitation.

If the excitation is resumed, and the origin return processing is performed, the phase of the excitation signal is set at the excitation start position A, and the indicating-needle 11a is positioned at the stopper position. As a result, the indicating-needle 11a drastically moves from the origin position to the stopper position as illustrated in FIG. 6A. Such behavior of the indicating-needle 11a may possibly be recognized as an unnatural movement by a driver who is viewing it. In FIG. 6A, the indicating-needle 11a vibrates at the stopper position while the excitation signal is being returned by the reversal angle. This phenomenon is caused by a rebound behavior of the indicating-needle 11a occurring during the elimination of the hysteresis characteristics (refer to Japanese Patent No. 4176984, for example).

The following describes the behavior of the indicating-needle in the start of excitation in a case where correction of a placing error is performed by the conventional excitation control with reference to FIGS. 7A, 7B, and 7C. FIGS. 7A, 7B, and 7C are diagrams illustrating an example of the origin return processing in a case where correction of the placing error is performed by the conventional excitation control. FIG. 7A is a diagram illustrating a temporal change in the excitation signal and the rotation angle of the indicating-needle. FIG. 7B is a diagram illustrating the relation between the phase of the excitation signal and the rotation angle of the indicating-needle. FIG. 7C is a vector diagram illustrating the position of the rotor.

In the example illustrated in FIGS. 7A, 7B, and 7C, a case is assumed where the indicating-needle 11a is driven in a manner deviated from a target position by a mechanical angle of 0.3 degrees. In other words, a case is assumed where the placing error of the indicating-needle 11a is 0.3 degrees. In this case, as illustrated in FIGS. 7A, 7B, and 7C, the origin return angle corresponding to the angle from the excitation start position A to the position after the origin return processing indicated by C is an angle obtained by adding a placing error correction angle X set based on a placing error of 0.3 degrees to the backlash angle. The reversal angle by which the phase of the excitation signal is returned from the excitation start position A is the basic reversal angle similarly to the example in FIGS. 6A, 6B, and 6C. As illustrated in FIGS. 7A, 7B, and 7C, performing the origin return processing makes it possible to position the indicating-needle 11a at the origin position.

In this case, the phase of the excitation signal after the termination processing is at the position indicated by C2 in FIGS. 7A, 7B, and 7C. At this time, the indicating-needle 11a stops at the origin position. If the excitation is resumed, and the origin return processing is performed, the phase of the excitation signal is set at the excitation start position A, and the indicating-needle 11a is positioned at the stopper position. As a result, the indicating-needle 11a drastically moves from the origin position to the stopper position as illustrated in FIG. 7A. In addition, if indication adjustment (indication correction) is performed to correct the placing error, the stopper position is further apart from the origin position as illustrated in FIG. 7A compared with a case where the indication adjustment (indication correction) is not performed. As a result, the amount of drastic movement of the indicating-needle 11a is further increased in the start of excitation.

As described above, the indicating-needle drastically moves in the start of excitation in the conventional excitation control. In a case where the respective indicating-needles of the speed meter 11, the tachometer 12, the fuel gauge 13, and the water-temperature gauge 14 have differences in whether correction of the placing error is performed and in the correction amount, for example, the behaviors of the indicating-needles in the start of excitation may possibly differ from one another. The difference in the behaviors may possibly be recognized as an unnatural movement by the driver. As illustrated in FIG. 8, for example, if correction of the placing error is performed on the indicating-needle 11a of the speed meter 11 (scale correction: performed) but is not performed on the indicating-needle of the tachometer 12 (scale correction: not performed), the indicating-needle 11a of the speed meter 11 alone moves in the start of excitation. As a result, the behavior of the indicating-needle 11a of the speed meter 11 is made larger than the behavior of the indicating-needle of the tachometer 12 in the start of excitation.

Figure 9A:
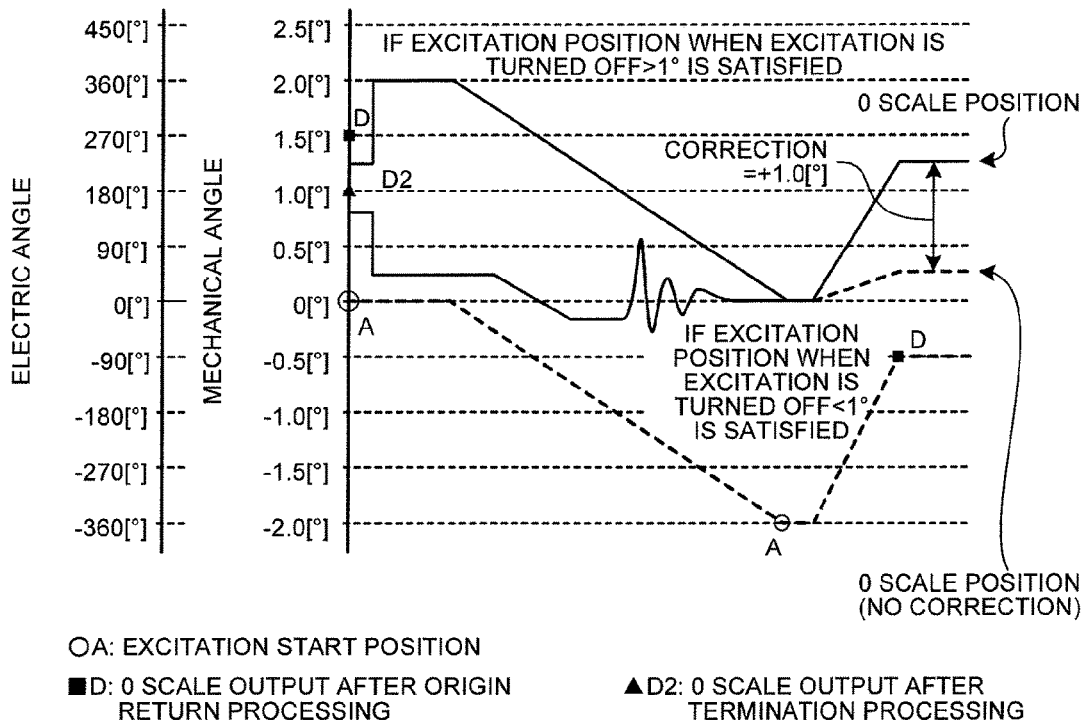
FIG. 9A is a diagram for explaining the behavior of the indicating-needle in a case where jumping occurs in the start of excitation and a diagram illustrating the relation between the phase of the excitation signal and the rotation angle of the indicating-needle.
Figure 9B:
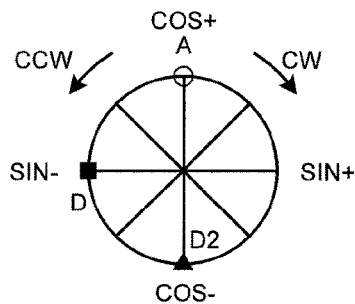
FIG. 9B is a diagram for explaining the behavior of the indicating-needle in a case where jumping occurs in the start of excitation and a vector diagram illustrating the position of the rotor.

The following describes the behavior of the indicating-needle in a case where jumping occurs in the start of excitation with reference to FIGS. 9A and 9B. FIGS. 9A and 9B are diagrams for explaining the behavior of the indicating-needle in a case where jumping occurs in the start of excitation. FIG. 9A is a diagram illustrating the relation between the phase of the excitation signal and the rotation angle of the indicating-needle. FIG. 9B is a vector diagram illustrating the position of the rotor.

FIGS. 9A and 9B illustrate an example where the correction amount of the placing error is a rotation angle of the indicating-needle 11a of 1.0 degree and is an electric angle of 180 degrees ($\pi$[rad]) corresponding to a half of the control period T0 of the excitation signal. After the origin return processing is performed, the phase of the excitation signal is at the position indicated by D in FIGS. 9A and 9B. After the termination processing is performed, the phase of the excitation signal is at the position indicated by D2 in FIGS. 9A and 9B. In this case, the rotation direction of the indicating-needle 11a varies depending on whether the phase of the excitation signal after the termination processing is slightly on the side in the forward direction or on the side in the backward direction with respect to 1.0 degree. As a result, the rotation direction of the indicating-needle 11a is not determined until the start of excitation. Specifically, if the phase of the excitation signal after the termination processing is larger than 1.0 degree as illustrated in FIG. 9A, the indicating-needle 11a initially moves from the origin position not in the backward direction (counterclockwise direction) corresponding to the stopper direction but in the forward direction (clockwise direction) and then moves in the stopper direction, that is, jumping occurs. By contrast, if the phase of the excitation signal after the termination processing is smaller than 1.0 degree, the indicating-needle 11a moves from the origin position in the backward direction corresponding to the stopper direction. Such jumping occurs when the correction amount of the placing error is larger than a rotation angle of the indicating-needle 11a of 1.0 degree. To prevent the jumping, it is conventionally necessary to make the correction amount of the placing error smaller than the amount corresponding to a half period of the excitation signal.

<Explanation of the Excitation Control Performed by the Indicating-Needle Type Meter Device According to the First Embodiment>

The following describes the behavior of the indicating-needle in the start of excitation in the indicating-needle type meter device according to the first embodiment with reference to FIGS. 10A, 10B, and 10C. FIGS. 10A, 10B, and 10C are diagrams illustrating an example of the origin return processing in the case of excitation control performed by the indicating-needle type meter device according to the first embodiment. FIG. 10A illustrates a temporal change in the excitation signal and the rotation angle of the indicating-needle. FIG. 10B is a diagram illustrating the relation between the phase of the excitation signal and the rotation angle of the indicating-needle. FIG. 10C is a vector diagram illustrating the phase of the excitation signal.

In the excitation control performed by the indicating-needle type meter device 10 according to the first embodiment, the excitation start position is different from that in the example illustrated in FIGS. 6A, 6B, and 6C. In the example illustrated in FIGS. 6A, 6B, and 6C, the excitation start position is the position indicated by A in FIGS. 10A, 10B, and 10C. By contrast, in the excitation control according to the first embodiment, the excitation start position is a position advanced from the phase of the excitation signal after the execution of the termination processing indicated by B2 by a half of the backlash angle. In other words, the excitation start position is the position indicated by A2 in FIGS. 10A, 10B, and 10C.

The excitation start position is the position indicated by A2 advanced from the position indicated by B2 by a half of the backlash angle (by a start-time correction angle). Therefore, the reversal angle is an angle obtained by adding the start-time correction angle to the basic reversal angle of 360 degrees (2π[rad]) corresponding to the control period T0 as illustrated in FIGS. 10A, 10B, and 10C. The origin return angle is the backlash angle similarly to the example illustrated in FIGS. 6A, 6B, and 6C.

In the excitation control performed by the indicating-needle type meter device 10 according to the first embodiment described above, the excitation start position is set to the position A2 advanced from the phase of the excitation signal after the execution of the termination processing by a half of the backlash angle. With this configuration, the rotor 52 of the stepping motor 111 moves within the backlash of the gear mechanism 20 in the start of excitation, whereby the indicating-needle 11a does not move in the start of excitation. After the excitation is started, the phase of the excitation signal is returned by the reversal angle. As a result, the indicating-needle 11a consecutively and smoothly rotates to the stopper position and then to the origin position (0 scale position), thereby being positioned at the origin position as illustrated in FIG. 10A. The rotation speed of the indicating-needle 11a to the stopper position may be equal to or different from that from the stopper position to the origin position. FIGS. 10A, 10B, and 10C illustrate an example where the speeds are different from each other. In the return of the phase of the excitation signal by the reversal angle, the indicating-needle 11a may consecutively and smoothly rotate to the stopper position, temporarily stop for a predetermined time, and then rotate to the origin position.

The following describes the behavior of the indicating-needle in the start of excitation in a case where correction of the placing error is performed by the excitation control performed by the indicating-needle type meter device according to the first embodiment with reference to FIGS. 11A, 11B, and 11C. FIGS. 11A, 11B, and 11C are diagrams illustrating an example of the origin return processing in a case where correction of the placing error is performed by the excitation control performed by the indicating-needle type meter device according to the first embodiment. FIG. 11A illustrates a temporal change in the excitation signal and the rotation angle of the indicating-needle. FIG. 11B illustrates the relation between the phase of the excitation signal and the rotation angle of the indicating-needle. FIG. 11C is a vector diagram illustrating the phase of the excitation signal.

In the excitation control in this example, the excitation start position is different from that in the example illustrated in FIGS. 7A, 7B, and 7C. In the example illustrated in FIGS. 7A, 7B, and 7C, the excitation start position is the position indicated by A in FIGS. 11A, 11B, and 11C. By contrast, in the excitation control according to the first embodiment, the excitation start position is a position advanced from the phase of the excitation signal after the execution of the termination processing indicated by C2 by a half of the backlash angle. In other words, the excitation start position is the position indicated by A3 in FIGS. 11A, 11B, and 11C.

The excitation start position is the position indicated by A3 advanced from the position indicated by C2 by a half of the backlash angle (by the start-time correction angle). Therefore, the reversal angle is an angle obtained by adding the start-time correction angle and the placing error correction angle X set based on a placing error of 0.3 degrees to the basic reversal angle (2π[rad]) as illustrated in FIG. 11A. The origin return angle is an angle obtained by adding the placing error correction angle X to the backlash angle similarly to the example illustrated in FIGS. 7A, 7B, and 7C.

Also in a case where correction of the placing error is performed as described above, the excitation start position is set to the position A3 advanced from the phase of the excitation signal after the execution of the termination processing by a half of the backlash angle. With this configuration, the rotor 52 of the stepping motor 111 moves within the backlash of the gear mechanism 20 in the start of excitation, whereby the indicating-needle 11a does not move in the start of excitation. After the excitation is started, the phase of the excitation signal is returned by the reversal angle. As a result, the indicating-needle 11a consecutively and smoothly rotates to the stopper position and then to the origin position as illustrated in FIG. 11A. The rotation speed of the indicating-needle 11a to the stopper position may be equal to or different from that from the stopper position to the origin position similarly to the example in FIGS. 7A, 7B, and 7C. FIGS. 11A, 11B, and 11C illustrate an example where the speeds are different from each other. In the return of the phase of the excitation signal by the reversal angle, the indicating-needle 11a may consecutively and smoothly rotate to the stopper position, temporarily stop for a predetermined time, and then rotate to the origin position.

<Processing Flow in the Origin Return Processing>

Figure 12:
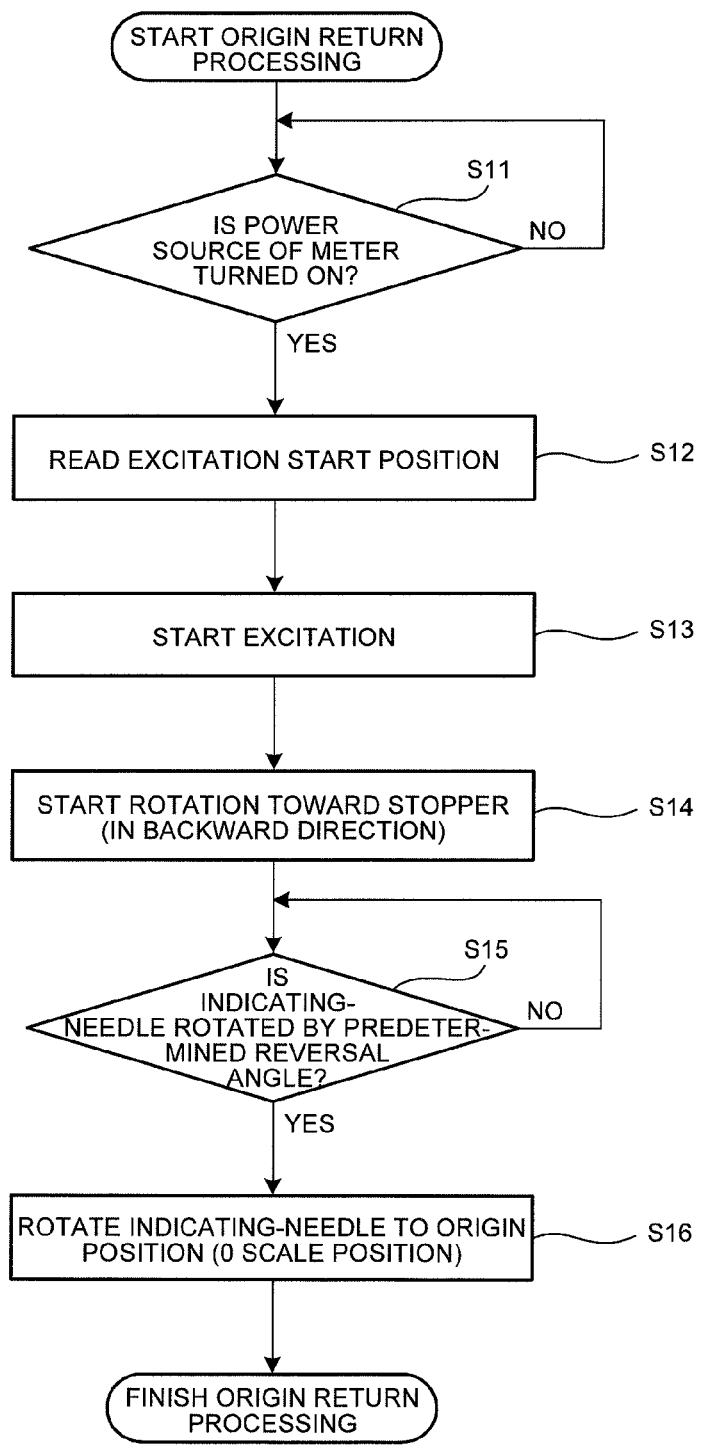
FIG. 12 is a flowchart illustrating a processing flow in the origin return processing performed by the indicating-needle type meter device according to the first embodiment.

The following describes the processing flow in the origin return processing performed by the indicating-needle type meter device according to the first embodiment with reference to FIG. 12. FIG. 12 is a flowchart illustrating the processing flow in the excitation control performed by the indicating-needle type meter device according to the first embodiment. The operation program for performing the processing illustrated in FIG. 12 is stored in the non-volatile memory 102 and executed by the controller 101.

At Step S11, the controller 101 determines whether the power source of the indicating-needle type meter device 10 is turned on. If the controller 101 determines that the power source is turned on as a result of the determination, the controller 101 performs the processing at Step S12. By contrast, if the controller 101 determines that the power source is not turned on, the controller 101 performs the processing at Step S11 again.

At Step S12, the controller 101 refers to the non-volatile memory 102 to read the excitation start position of the excitation signal to be transmitted to the stepping motor 111.

As described above, the excitation start position is a position advanced from the phase of the excitation signal after the execution of the termination processing by a half of the backlash angle. The phase of the excitation signal after the execution of the termination processing is stored in the non-volatile memory 102 by the controller 101 when the previous termination processing is executed. The magnitude of the backlash angle is also stored in the non-volatile memory 102 in advance.

At Step S13, the controller 101 starts excitation of the stepping motor 111 and sets the phase of the excitation signal to the excitation start position read at Step S12. In the excitation start position, the indicating-needle 11a is positioned at the origin position (0 scale position) corresponding to the stop position after the execution of the termination processing. When the phase of the excitation signal is set to the excitation start position, the rotor 52 of the stepping motor 111 moves within the backlash of the gear mechanism 20, whereby the indicating-needle 11a does not move.

At Step S14, the controller 101 returns the phase of the excitation signal to start rotation of the indicating-needle 11a toward the stopper (in the backward direction).

At Step S15, the controller 101 determines whether the angle formed from when the phase of the excitation signal starts to be returned at Step S14 exceeds the predetermined reversal angle. If the control unit 101 determines that the angle exceeds the reversal angle as a result of the determination, the controller 101 performs the processing at Step S16. By contrast, if the controller 101 determines that the angle does not exceed the reversal angle, the controller 101 performs the processing at Step S15 again. Consequently, the phase of the excitation signal is returned by the reversal angle. As described above, the reversal angle is an angle obtained by adding the start-time correction angle (a half of the backlash angle) and, in a case where a placing error is present, the placing error correction angle X set based on the placing error to the basic reversal angle of 360 degrees (2π[rad]) corresponding to the control period T0. Whether a placing error is present and the magnitude of the placing error are measured by an operator or the like in the placing operation of the indicating-needle 11a and stored in the non-volatile memory 102.

After the indicating-needle 11a is rotated from the origin position (0 scale position) to the stopper position by the processing at Steps S14 and S15, the excitation signal is returned by the basic reversal angle to perform step-out reset.

In the return of the phase of the excitation signal by the reversal angle at Steps S14 and S15, the controller 101 may first return the phase by the angle obtained by adding the start-time correction angle and, in a case where a placing error is present, the placing error correction angle X. After waiting for a predetermined time, the controller 101 may further return the phase by the basic reversal angle. With this configuration, the step-out reset is performed after the indicating-needle 11a temporarily stops at the stopper position.

At Step S16, the controller 101 advances the phase of the excitation signal by the predetermined origin return angle. As described above, the origin return angle corresponds to the backlash angle in a case where correction of a placing error is not performed and to an angle obtained by adding the placing error correction angle X to the backlash angle in a case where correction of a placing error is performed.

By the processing at Step S16, the indicating-needle 11a is rotated in the forward direction from the stopper position to the origin position (0 scale position) to be positioned at the origin position.

Subsequently, the controller 101 finishes the origin return processing.

<Functions and Effects of the Indicating-Needle Type Meter Device According to the First Embodiment>

In the indicating-needle type meter device 10 according to the first embodiment, the excitation start position is set to a position advanced from the phase of the excitation signal after the execution of the termination processing by the start-time correction angle, which is a half of the backlash angle. With this configuration, the rotor 52 of the stepping motor 111 moves within the backlash of the gear mechanism 20 in the start of excitation, whereby the indicating-needle 11a does not move in the start of excitation. It is thus possible to prevent an unnatural behavior of the indicating-needle 11a in the start of excitation. Furthermore, by causing the respective indicating-needles of the instruments including the tachometer 12, the fuel gauge 13, and the water-temperature gauge 14 to simultaneously and consecutively move from the position in the start of excitation to the stopper position, all the indicating-needles ceremonially move, making it possible to reduce a feeling of strangeness given to the driver. In addition, because the indicating-needle does not move in the start of excitation, it is possible to prevent the indicating-needle from jumping in the start of excitation even if the correction amount of the placing error is a half period of the excitation signal. Because the jumping can be prevented in this manner, the correction amount of the placing error needs not be smaller than the amount corresponding to a half period of the excitation signal. There is no need to set a limit on the correction amount.

While the start-time correction angle according to the first embodiment is a half of the backlash angle, it simply needs to be a value smaller than the backlash angle. With this setting, the rotor 52 of the stepping motor 111 moves within the backlash of the gear mechanism 20 in the start of excitation, whereby the indicating-needle 11a does not move in the start of excitation. In other words, the excitation start position may be a position advanced from the phase of the excitation signal after the execution of the termination processing by the start-time correction angle smaller than the backlash angle.

Second Embodiment

The following describes a indicating-needle type meter device 10B according to a second embodiment. The indicating-needle type meter device 10B is different from the indicating-needle type meter device 10 only in the contents of the origin return processing and has the same configuration, such as the electric circuit, as that of the indicating-needle type meter device 10. Like members are denoted by like reference numerals, and overlapping explanation thereof will be omitted.

Schematically, the indicating-needle type meter device 10B is different from the indicating-needle type meter device 10 in that the origin position (0 scale position) is pre-offset in the forward direction.

<In a Case where Correction of a Placing Error is not Performed>

Figure 13A:
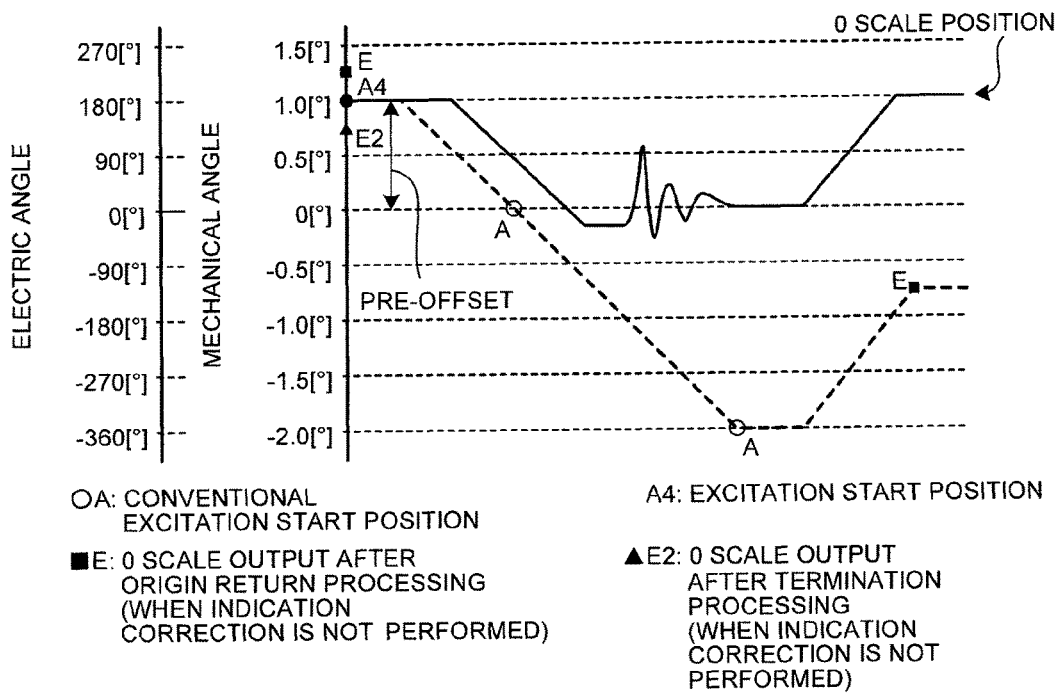
FIG. 13A is a diagram illustrating an example of the origin return processing in the case of a indicating-needle type meter device according to a second embodiment and illustrating a temporal change in the excitation signal and the rotation angle of the indicating-needle.
Figure 13B:
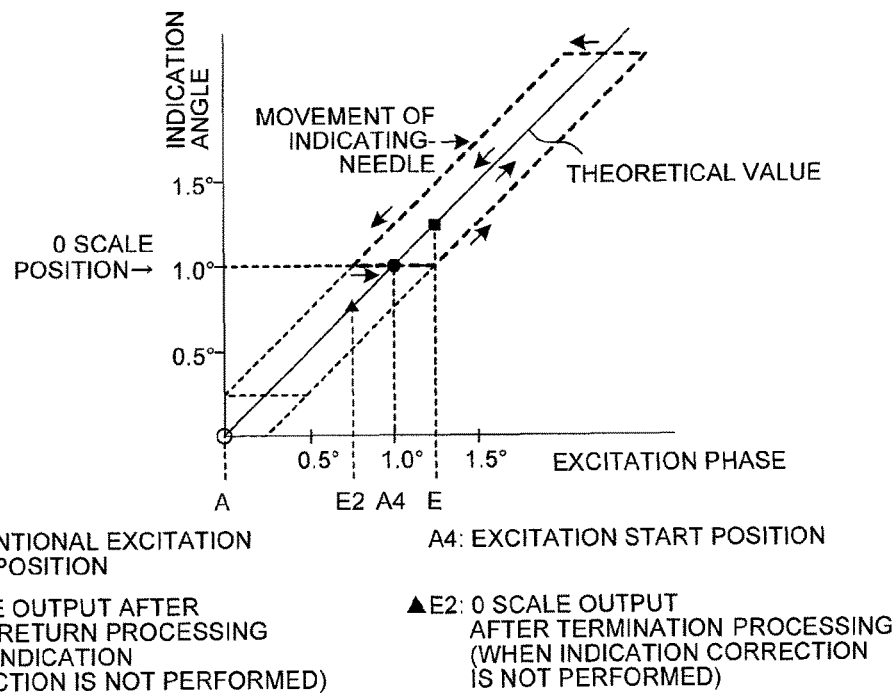
FIG. 13B is a diagram illustrating an example of the origin return processing in the case of the indicating-needle type meter device according to the second embodiment and illustrating the relation between the phase of the excitation signal and the rotation angle of the indicating-needle.

FIGS. 13A, 13B, and 13C are diagrams illustrating an example of the origin return processing in the case of the indicating-needle type meter device according to the second embodiment. FIG. 13A illustrates a temporal change in the excitation signal and the rotation angle of the indicating-needle. FIG. 13B illustrates the relation between the phase of the excitation signal and the rotation angle of the indicating-needle. FIG. 13C is a vector diagram illustrating the phase of the excitation signal.

In the excitation control performed by the indicating-needle type meter device 10B according to the second embodiment in a case where correction of a placing error is not performed illustrated in FIGS. 13A, 13B, and 13C, the origin return angle and the reversal angle are different from those of the example illustrated in FIGS. 10A, 10B, and 10C. Specifically, the origin return angle is set to an angle obtained by adding a predetermined positive pre-offset angle to the backlash angle. The reversal angle is set to an angle obtained by adding the basic reversal angle of 360 degrees ($2\pi$[rad]) corresponding to the control period T0, the start-time correction angle (a half of the backlash angle), and the pre-offset angle. In the example illustrated in FIGS. 13A, 13B, and 13C, the pre-offset angle is set to 180 degrees ($\pi$[rad]) in the excitation signal corresponding to a rotation angle of the indicating-needle 11a of 1.0 degree. The pre-offset angle may be set to a desired value as long as it is equal to or larger than an angle at which the indicating-needle 11a is separated from the stopper 26 when the indicating-needle 11a is rotated in the forward direction from the stopper position by the pre-offset angle.

The excitation start position is a position advanced from the phase of the excitation signal after the execution of the termination processing by a half of the backlash angle similarly to the example illustrated in FIGS. 10A, 10B, and 10C.

In the example illustrated in FIGS. 13A, 13B, and 13C, the phase of the excitation signal after the execution of the origin return processing is the position indicated by E, and the phase of the excitation signal after the execution of the termination processing is the position indicated by E2. The excitation start position is a position advanced from E2 by a half of the backlash angle, that is, the position indicated by A4.

As described above, even if the pre-offset angle is added to the origin return angle and the reversal angle, it is possible to position the indicating-needle 11a at the origin position similarly to the example illustrated in FIGS. 10A, 10B, and 10C.

<In a Case where Correction of a Placing Error is Performed in the Forward Direction>

FIGS. 14A, 14B, and 14C are diagrams illustrating an example of the origin return processing in a case where correction of a placing error is performed in the forward direction by the excitation control performed by the indicating-needle type meter device according to the second embodiment. FIG. 14A illustrates a temporal change in the excitation signal and the rotation angle of the indicating-needle. FIG. 14B illustrates the relation between the phase of the excitation signal and the rotation angle of the indicating-needle. FIG. 14C is a vector diagram illustrating the phase of the excitation signal.

In the excitation control performed by the indicating-needle type meter device 10B according to the second embodiment in a case where correction of a placing error is performed in the forward direction illustrated in FIGS. 14A, 14B, and 14C, the origin return angle and the reversal angle are different from those of the example illustrated in FIGS. 11A, 11B, and 11C. Specifically, the origin return angle is set to an angle obtained by adding the predetermined positive pre-offset angle and a positive placing error correction angle to the backlash angle. In the example illustrated in FIGS. 14A, 14B, and 14C, the placing error correction angle is set to 90 degrees ($\pi$/2[rad]) in the excitation signal corresponding to a rotation angle of the indicating-needle 11a of 0.5 degrees. The reversal angle is set to an angle obtained by adding the basic reversal angle of 360 degrees ($2\pi$[rad]) corresponding to the control period T0, the start-time correction angle (a half of the backlash angle), the pre-offset angle, and the placing error correction angle.

The excitation start position is a position advanced from the phase of the excitation signal after the execution of the termination processing by a half of the backlash angle similarly to the example illustrated in FIGS. 11A, 11B, and 11C.

In the example illustrated in FIGS. 14A, 14B, and 14C, the phase of the excitation signal after the execution of the origin return processing is the position indicated by F, and the phase of the excitation signal after the execution of the termination processing is the position indicated by F2. The excitation start position is a position advanced from F2 by a half of the backlash angle, that is, the position indicated by A5.

As described above, even if the pre-offset angle and the positive placing error correction angle are added to the origin return angle and the reversal angle, it is possible to position the indicating-needle 11a at the origin position similarly to the example illustrated in FIGS. 11A, 11B, and 11C.

<In a Case where Correction of a Placing Error is Performed in the Backward Direction>

Figure 15A:
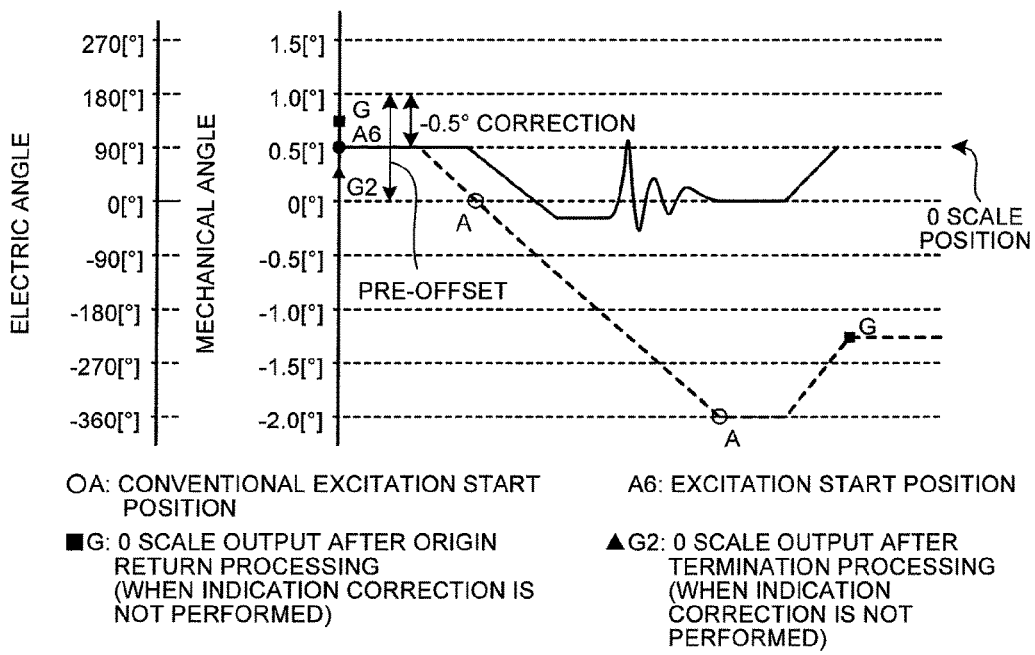
FIG. 15A is a diagram illustrating an example of the origin return processing in a case where correction of the placing error is performed in a backward direction by the excitation control performed by the indicating-needle type meter device according to the second embodiment and illustrating a temporal change in the excitation signal and the rotation angle of the indicating-needle.
Figure 15B:
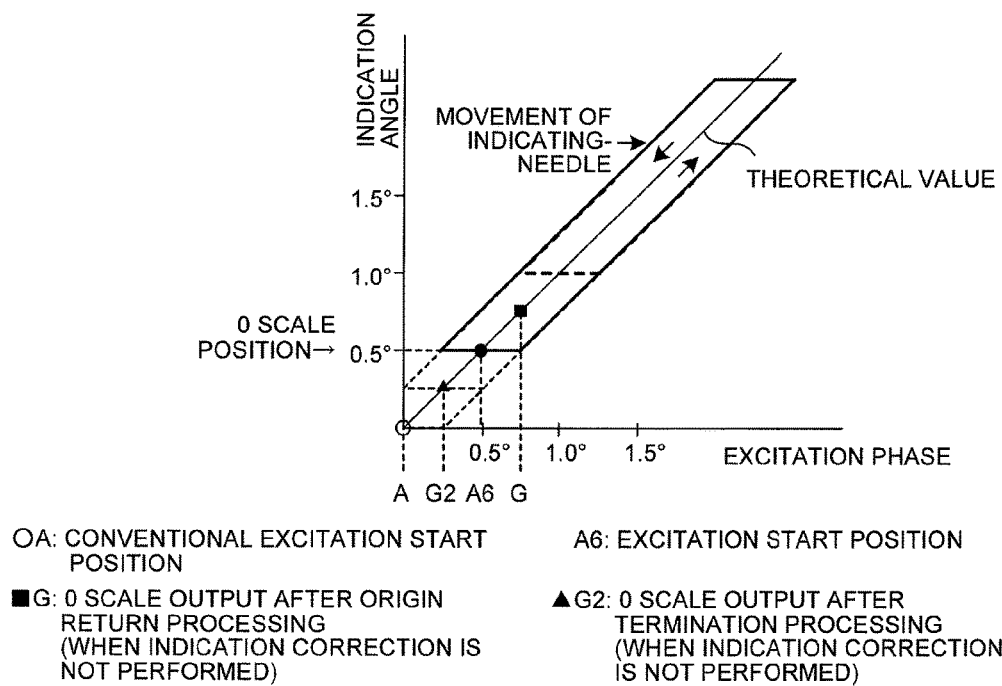
FIG. 15B is a diagram illustrating an example of the origin return processing in a case where correction of the placing error is performed in the backward direction by the excitation control performed by the indicating-needle type meter device according to the second embodiment and illustrating the relation between the phase of the excitation signal and the rotation angle of the indicating-needle.
Figure 15C:
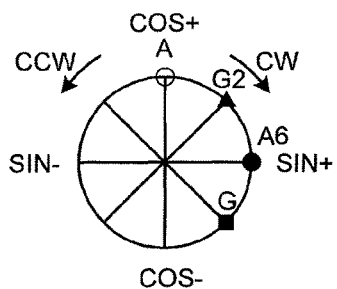
FIG. 15C is a diagram illustrating an example of the origin return processing in a case where correction of the placing error is performed in the backward direction by the excitation control performed by the indicating-needle type meter device according to the second embodiment and a vector diagram illustrating the phase of the excitation signal.

FIGS. 15A, 15B, and 15C are diagrams illustrating an example of the origin return processing in a case where correction of a placing error is performed in the backward direction by the excitation control performed by the indicating-needle type meter device according to the second embodiment. FIG. 15A illustrates a temporal change in the excitation signal and the rotation angle of the indicating-needle. FIG. 15B illustrates the relation between the phase of the excitation signal and the rotation angle of the indicating-needle. FIG. 15C is a vector diagram illustrating the phase of the excitation signal.

In the excitation control performed by the indicating-needle type meter device 10B according to the second embodiment in a case where correction of a placing error is performed in the backward direction illustrated in FIGS. 15A, 15B, and 15C, the origin return angle and the reversal angle are different from those of the other examples. Specifically, the origin return angle is set to an angle obtained by adding the predetermined positive pre-offset angle and a negative placing error correction angle to the backlash angle. In the example illustrated in FIGS. 15A, 15B, and 15C, the placing error correction angle is set to -90 degrees (-$\pi$/2 [rad]) in the excitation signal corresponding to a rotation angle of the indicating-needle 11a of -0.5 degrees. The reversal angle is set to an angle obtained by adding the basic reversal angle of 360 degrees ($2\pi$[rad]) corresponding to the control period T0, the start-time correction angle (a half of the backlash angle), the pre-offset angle, and the placing error correction angle. The negative placing error correction angle can be set to a value smaller than the pre-offset angle.

The excitation start position is a position advanced from the phase of the excitation signal after the execution of the termination processing by a half of the backlash angle similarly to the other examples.

In the example illustrated in FIGS. 15A, 15B, and 15C, the phase of the excitation signal after the execution of the origin return processing is the position indicated by G, and the phase of the excitation signal after the execution of the termination processing is the position indicated by G2. The excitation start position is a position advanced from G2 by a half of the backlash angle, that is, the position indicated by A6.

As described above, even if the pre-offset angle and the negative placing error correction angle are added to the origin return angle and the reversal angle, it is possible to position the indicating-needle 11a at the origin position similarly to the other examples described above.

As described above, the indicating-needle type meter device 10B according to the second embodiment can permit the placing error of the indicating-needle 11a in the forward direction and the backward direction with respect to the stopper 26 because the predetermined positive pre-offset angle is added to the origin return angle. This configuration enables, in the placing operation of the indicating-needle 11a, the operator to place the indicating-needle 11a into positions on both sides in the forward and backward directions with respect to the predetermined position. It is thus possible to increase the degree of freedom in correction of the placing error.

The pre-offset angle may be different values among the respective indicating-needles of the speed meter 11, the tachometer 12, the fuel gauge 13, and the water-temperature gauge 14. Different pre-offset angles may be set for each group depending on the length and the design of the indicating-needles. The pre-offset angle for the instruments having a long indicating-needle, such as the speed meter 11 and the tachometer 12, may be set to an indication angle of the indicating-needle of 1.0 degree, for example, and the pre-offset angle for the instruments having a short indicating-needle, such as the fuel gauge 13 and the water-temperature gauge 14, may be set to an indication angle of the indicating-needle of 0.5 degrees.

In the origin return processing performed by the indicating-needle type meter device 10B according to the second embodiment, the indicating-needle type meter device 10B may consecutively return the phase of the excitation signal by the reversal angle in the processing corresponding to that performed at Steps S14 and S15 in FIG. 12. Alternatively, the indicating-needle type meter device 10B may first return the phase of the excitation signal by an angle obtained by adding the start-time correction angle, the pre-offset angle, and, in a case where a placing error is present, the placing error correction angle X, wait for a predetermined time, and then further return the phase by the basic reversal angle. With this configuration, the elimination of hysteresis characteristics is performed after the indicating-needle 11a temporarily stops at the stopper position.

The following summarizes the indicating-needle type meter devices 10 and 10B according to the embodiments.

(1) The indicating-needle type meter device 10B includes the controller 101, the stepping motor 111 driven to rotate based on the phase of the excitation signal received from the controller 101, the indicating-needle 11a that rotates in both forward and backward directions in response to rotation of the stepping motor 111, and the gear mechanism 20 that transmits rotational driving force of the stepping motor 111 to the indicating-needle 11a. The indicating-needle 11a or the gear mechanism 20 includes the stopper pin 24a serving as the abutting portion that abuts on the stopper 26 when the indicating-needle 11a is positioned at the predetermined rotational position. When starting excitation of the stepping motor 111, the controller 101 sets the phase of the excitation signal to the predetermined excitation start position. Subsequently, the controller 101 returns the phase of the excitation signal by the predetermined reversal angle such that the indicating-needle 11a rotates in the backward direction corresponding to a direction in which the abutting portion comes closer to the stopper 26. The controller 101 thus positions the indicating-needle 11a at the stopper position at which the abutting portion abuts on the stopper 26. Subsequently, the controller 101 advances the phase of the excitation signal by the origin return angle set based on the backlash angle corresponding to the backlash amount in the gear mechanism 20. The controller 101 thus rotates the indicating-needle 11a in the forward direction to the origin position apart from the stopper position by the predetermined angle, thereby positioning the indicating-needle 11a at the origin position. The processing described above is the origin return processing. When terminating excitation of the stepping motor 111, the controller 101 performs the termination processing of returning the phase of the excitation signal such that the indicating-needle 11a rotates in the backward direction to be positioned at the origin position. The origin return angle is an angle obtained by adding the backlash angle, the predetermined positive pre-offset angle, and the positive placing error correction angle set based on the placing error of the indicating-needle 11a with respect to the stopper 26.

(2) The indicating-needle type meter device 10B includes the speed meter 11 serving as a first instrument and the fuel gauge 13 serving as a second instrument. The indicating-needle 11a is provided to the first instrument and the second instrument as a first indicating-needle and a second indicating-needle, respectively. The pre-offset angle is different between the first indicating-needle and the second indicating-needle.

(3) In the indicating-needle type meter devices 10 and 10B, the excitation start position is a position advanced from the phase of the excitation signal after the execution of the termination processing by the start-time correction angle smaller than the backlash angle.

The indicating-needle type meter devices 10 and 10B according to (3) can prevent an unnatural behavior of the indicating-needle 11a in the start of excitation while permitting the placing error of the indicating-needle 11a in the forward direction and the backward direction with respect to the stopper 26.

In the indicating-needle type meter devices 10 and 10B according to (3), the excitation start position is set to a position advanced from the phase of the excitation signal after the execution of the termination processing by the start-time correction angle smaller than the backlash angle. With this configuration, the rotor 52 of the stepping motor 111 moves within the backlash of the gear mechanism 20 in the start of excitation, whereby the indicating-needle 11a does not move in the start of excitation. It is thus possible to prevent an unnatural behavior of the indicating-needle 11a in the start of excitation. In a case where correction of the placing error is performed on each of the instruments, all the indicating-needles are caused to simultaneously and consecutively move from the position in the start of excitation to the stopper position, for example. With this configuration, all the indicating-needles ceremonially move, making it possible to reduce a feeling of strangeness given to the driver. In addition, because the indicating-needle does not move in the start of excitation, it is possible to prevent the indicating-needle from jumping in the start of excitation even if the correction amount of the placing error is larger than the amount corresponding to a half period of the excitation signal. Because the jumping can be prevented in this manner, the correction amount of the placing error needs not be smaller than the amount corresponding to a half period of the excitation signal. There is no need to set a limit on the correction amount.

If the predetermined positive pre-offset angle is simply added to the origin return angle in the conventional control method, the stopper position and the origin position are separated from each other by the addition. As a result, the stopper position and the origin position are further away from each other than a case where the pre-offset angle is not added, resulting in a further increase in the amount of drastic movement of the indicating-needle 11a in the start of excitation. Even if the degree of freedom in correction of the placing error can be increased, the feeling of strangeness given to the driver in the start of excitation may possibly be increased.

By contrast, in the indicating-needle type meter devices 10 and 10B according to (3), the indicating-needle 11a does not move in the start of excitation. Therefore, the indicating-needle type meter devices 10 and 10B according to (3) can prevent an unnatural behavior of the indicating-needle 11a in the start of excitation while increasing the degree of freedom in correction of the placing error.

Because the pre-offset angle is set to a positive value, the indicating-needle 11a rotates only in the backward direction, in which the indicating-needle 11a comes closer to the stopper 26, from just after the start of excitation and to when it moves to the stopper position. This configuration can align, in a case where a plurality of indicating-needles are provided, the movement directions of the indicating-needles.

(4) In the indicating-needle type meter device 10B, the reversal angle is an angle obtained by adding the basic reversal angle set to a value equal to or larger than an angle corresponding to the control period T0 of the excitation signal, the start-time correction angle, the pre-offset angle, and the placing error correction angle. When returning the phase of the excitation signal by the reversal angle in the origin return processing, the controller 101 first returns the phase by the angle obtained by adding the start-time correction angle, the pre-offset angle, and the placing error correction angle, waits for the predetermined time, and then further returns the phase by the basic reversal angle. In other words, when returning the phase of the excitation signal by the reversal angle in the origin return processing, the controller 101 first returns the phase by an angle obtained by subtracting the basic reversal angle from the reversal angle, waits for the predetermined time, and then further returns the phase by the basic reversal angle.

The indicating-needle type meter device 10B according to (4) first returns the phase of the excitation signal by the angle obtained by adding the start-time correction angle, the pre-offset angle, and the placing error correction angle, waits for the predetermined time, and then further returns the phase by the basic reversal angle. With this configuration, the elimination of hysteresis characteristics is performed after the indicating-needle 11a temporarily stops at the stopper position. During the elimination of hysteresis characteristics, a rebound behavior of the indicating-needle 11a, vibrating at the stopper position, occurs while the excitation signal is changing in one period (refer to Japanese Patent No. 4176984, for example). In the indicating-needle type meter device 10B according to (4), the rebound behavior occurs after the indicating-needle 11a temporarily stops at the stopper position, which can cause the driver to recognize that all the indicating-needles move on purpose.

The embodiments above are not intended to limit the technological scope of the present invention. The embodiments above may include various changes, modifications, and other variations within the technological scope of the invention.

The indicating-needle type meter device according to the present invention can provide a indicating-needle type meter device that can increase the degree of freedom in correction of a placing error.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An indicating-needle type meter device comprising:
   a controller;
   a stepping motor driven to rotate according to a phase of an excitation signal received from the controller;
   an indicating-needle that rotates in both forward and backward directions in response to rotation of the stepping motor; and
   a gear mechanism that transmits rotational driving force of the stepping motor to the indicating-needle, wherein
   the indicating-needle or the gear mechanism includes an abutting portion that abuts on a stopper when the indicating-needle is positioned at a predetermined rotational position,
   the controller performs, when starting excitation of the stepping motor, origin return processing of: setting the phase of the excitation signal to a predetermined excitation start position, returning the phase of the excitation signal by a predetermined reversal angle such that the indicating-needle rotates in the backward direction corresponding to a direction in which the abutting portion comes closer to the stopper, thereby positioning the indicating-needle at a stopper position at which the abutting portion abuts on the stopper, and advancing the phase of the excitation signal by an origin return angle set based on a backlash angle corresponding to a backlash amount in the gear mechanism, thereby rotating the indicating-needle in the forward direction to an origin position apart from the stopper position by a predetermined angle and thus positioning the indicating-needle at the origin position,
   the controller performs, when terminating excitation of the stepping motor, termination processing of returning the phase of the excitation signal such that the indicating-needle rotates in the backward direction to be positioned at the origin position, and
   the origin return angle is an angle obtained by adding the backlash angle, a predetermined positive pre-offset angle, and a positive or negative placing error correction angle set based on a placing error of the indicating-needle with respect to the stopper.

2. The indicating-needle type meter device according to claim 1, further comprising:
   a first instrument and a second instrument, wherein
   the indicating-needle is provided to the first instrument and the second instrument as a first indicating-needle and a second indicating-needle, respectively, and
   the pre-offset angle is different between the first indicating-needle and the second indicating-needle.

3. An indicating-needle type meter device comprising:
   a controller;
   a stepping motor driven to rotate according to a phase of an excitation signal received from the controller;

an indicating-needle that rotates in both forward and backward directions in response to rotation of the stepping motor; and a gear mechanism that transmits rotational driving force of the stepping motor to the indicating-needle, wherein the indicating-needle or the gear mechanism includes an abutting portion that abuts on a stopper when the indicating-needle is positioned at a predetermined rotational position, the controller performs, when starting excitation of the stepping motor, origin return processing of: setting the phase of the excitation signal to a predetermined excitation start position, returning the phase of the excitation signal by a predetermined reversal angle such that the indicating-needle rotates in the backward direction corresponding to a direction in which the abutting portion comes closer to the stopper, thereby positioning the indicating-needle at a stopper position at which the abutting portion abuts on the stopper, and advancing the phase of the excitation signal by an origin return angle set based on a backlash angle corresponding to a backlash amount in the gear mechanism, thereby rotating the indicating-needle in the forward direction to an origin position apart from the stopper position by a predetermined angle and thus positioning the indicating-needle at the origin position, the controller performs, when terminating excitation of the stepping motor, termination processing of returning the phase of the excitation signal such that the indicating-needle rotates in the backward direction to be positioned at the origin position, and the excitation start position is a position advanced from the phase of the excitation signal after execution of the termination processing by a start-time correction angle smaller than the backlash angle.

4. The indicating-needle type meter device according to claim 3, wherein the start-time correction angle is approximately a half of the backlash angle.

5. The indicating-needle type meter device according to claim 4, wherein the origin return angle is an angle obtained by adding the backlash angle and a positive placing error correction angle set based on a placing error of the indicating-needle with respect to the stopper.

6. The indicating-needle type meter device according to claim 4, wherein the origin return angle is an angle obtained by adding the backlash angle, a positive or negative placing error correction angle set based on a placing error of the indicating-needle with respect to the stopper, and a predetermined positive pre-offset angle.

7. The indicating-needle type meter device according to claim 4, wherein the reversal angle is an angle obtained by adding a basic reversal angle set to a value equal to or larger than an angle corresponding to a control period of the excitation signal and the start-time correction angle, and when returning the phase of the excitation signal by the reversal angle in the origin return processing, the controller first returns the phase of the excitation signal by the start-time correction angle, waits for a predetermined time, and then further returns the phase of the excitation signal by the basic reversal angle.

8. The indicating-needle type meter device according to claim 3, wherein the origin return angle is an angle obtained by adding the backlash angle and a positive placing error correction angle set based on a placing error of the indicating-needle with respect to the stopper.

9. The indicating-needle type meter device according to claim 8, wherein the origin return angle is an angle obtained by adding the backlash angle, a positive or negative placing error correction angle set based on a placing error of the indicating-needle with respect to the stopper, and a predetermined positive pre-offset angle.

10. The indicating-needle type meter device according to claim 3, wherein the origin return angle is an angle obtained by adding the backlash angle, a positive or negative placing error correction angle set based on a placing error of the indicating-needle with respect to the stopper, and a predetermined positive pre-offset angle.

11. The indicating-needle type meter device according to claim 3, wherein the reversal angle is an angle obtained by adding a basic reversal angle set to a value equal to or larger than an angle corresponding to a control period of the excitation signal and the start-time correction angle, and when returning the phase of the excitation signal by the reversal angle in the origin return processing, the controller first returns the phase of the excitation signal by the start-time correction angle, waits for a predetermined time, and then further returns the phase of the excitation signal by the basic reversal angle.

* * * * *